US011985474B2

(12) United States Patent
Hall

(10) Patent No.: US 11,985,474 B2
(45) Date of Patent: May 14, 2024

(54) ADJUSTABLE HELMET-MOUNTED CIRCUMAURAL ADAPTOR

(71) Applicant: WILCOX INDUSTRIES CORP., Newington, NH (US)

(72) Inventor: Edward R. Hall, Starksboro, VT (US)

(73) Assignee: Wilcox Industries Corp., Newington, NH (US)

( * ) Notice: Subject to any disclaimer, the term of this patent is extended or adjusted under 35 U.S.C. 154(b) by 212 days.

(21) Appl. No.: 17/719,132

(22) Filed: Apr. 12, 2022

(65) Prior Publication Data

US 2022/0345807 A1 Oct. 27, 2022

Related U.S. Application Data

(60) Provisional application No. 63/179,792, filed on Apr. 26, 2021.

(51) Int. Cl.
*H04R 25/00* (2006.01)
*H04R 1/10* (2006.01)

(52) U.S. Cl.
CPC ......... *H04R 1/1066* (2013.01); *H04R 1/1008* (2013.01)

(58) Field of Classification Search
CPC ...... H04R 1/1066; H04R 1/1008; H04R 1/04; H04R 1/025; H04R 2420/07; H04R 1/02
See application file for complete search history.

(56) References Cited

U.S. PATENT DOCUMENTS

| | | | | |
|---|---|---|---|---|
| 3,263,032 | A | 7/1966 | Scanlon | |
| 3,721,993 | A | 3/1973 | Lonnstedt | |
| 3,795,919 | A | 3/1974 | Aho | |
| 4,027,341 | A | 6/1977 | Patteri | |
| 8,028,334 | B2 | 9/2011 | Andreev et al. | |
| D766,871 | S | 9/2016 | Winters et al. | |
| 2018/0168270 | A1 * | 6/2018 | Vaccaro ................. | H04R 1/105 |

OTHER PUBLICATIONS

European Search Report dated Aug. 30, 2022 received in EP22169257.7.

(Continued)

*Primary Examiner* — Amir H Etesam
(74) *Attorney, Agent, or Firm* — McLane Middleton, Professional Association

(57) ABSTRACT

An adapter assembly for attaching a circumaural device to a mounting interface on a helmet comprises a fastener element configured to releasably couple to the mounting interface. A pressure relief assembly coupled to the fastener element has a pivoting subassembly and an adjustment subassembly. The pivoting subassembly I pivotable about a pivot axis and has a range of travel between an upright position and an extended position. One or more attachment arms have a proximal end coupled to the pressure relief assembly and a distal end for attaching the circumaural device. The adjustment subassembly has a manually operable control portion to cause pivoting movement of the pivoting subassembly toward the upright position to decrease a pressure of an attached circumaural device on a wearer's head or toward the extended position to increase a pressure of an attached circumaural device on the wearer's head.

20 Claims, 28 Drawing Sheets

LESS PRESSURE

(56) References Cited

OTHER PUBLICATIONS

OpticsPlanet.com, "Unity Tactical Modular Attached Rail Kit Only," <https://www.opticsplanet.com/unity-tactical-modular-attached-rail-kit-only.html>, accessed Jun. 27, 2022.
OpticsPlanet.com, "OTTO Engineering NoizeBarrier TAC Helmet Mounts," <https://www.opticsplanet.com/otto-engineering-noizebarrier-helmet-mount-noizebarrier-tac.html>, accessed Jun. 27, 2022.
DLP Tactical, "MSA Sordin Headset adaptor for Team Wendy & M-Lok compatible helmet ARC Rail," <https://www.dlptactical.com/products/dlp-tactical-msa-sordin-headset-adaptor-for-m-lok-compatible-helmet-arc-rail?variant-5306874658846>, accessed Jun. 27, 2022.
DLP Tactical, "Helmet ARC Rail Adaptor Set for Peltor ComTac Headsets," <https://www.dlptactical.com/products/helmet-arc-rail-adaptor-set-for-peltor-comtac-headsets?variant=5321260498974>, accessed Jun. 27, 2022.

* cited by examiner

LESS PRESSURE

MORE PRESSURE

LESS PRESSURE

MORE PRESSURE

LESS PRESSURE

MORE PRESSURE

ADJUSTABLE HELMET-MOUNTED CIRCUMAURAL ADAPTOR

CROSS REFERENCE TO RELATED APPLICATION

This application claims the priority benefit of U.S. provisional application Ser. No. 63/179,792 filed Apr. 26, 2021. The aforementioned application is incorporated herein by reference in its entirety.

BACKGROUND

Any discussion of patents, publications, or other information throughout the specification is intended only to facilitate an understanding of the present invention and should in no way be considered as an admission that such patents, publications, or other information are prior art. Likewise, any discussion of prior art throughout the specification should in no way be considered as an admission that such prior art is widely known or forms part of the common general knowledge in the field.

The present invention relates to helmet-mounted adaptors and, more particularly, to helmet-mountable adaptors for attaching circumaural devices. Such circumaural devices may include headphones, devices for hearing protection, communication headsets, or combinations thereof.

Existing circumaural devices having overhead spring bands are configured to provide side-squeeze to create a tight seal of the ear cup portions of the device against the head and/or around the ears to reduce or protect against ambient noise. The overhead band portions are often incompatible or interfere with helmets or helmet liners. It is often also desirable for the user to be able to temporarily remove the circumaural device from either or both ears, such as to allow for better hearing, greater situational awareness, relief from heat and pressure, etc., without the need to remove the helmet. Existing adaptor assemblies attempting to address these issues are configured to attach circumaural devices directly to the helmet and typically provide two positions (i.e., compressed position for more pressure against the head/ear or open position for less pressure against the head/ear). Such adaptor assemblies often require at least partial disassembly of the adaptor or mounting assembly in order to connect the mounting assembly to a helmet accessory mount and further require disassembly and external tools in order to make adjustments to the position of the adaptor or mounting assembly relative to the helmet and/or user. Furthermore, due to the limited range of adjustment for existing circumaural devices, multiple sizes of such devices must be produced to accommodate varying head sizes and shapes.

The present disclosure contemplates an adaptor for a circumaural device capable of fine adjustment of the amount of pressure of the circumaural device against the head/ear without the need to remove the helmet or external tools. The contemplated adaptor allows for a wider range of adjustment positions, allowing for use with many different head sizes and shapes. This also allows for use of one device by multiple persons with ease of adjustment. In certain embodiments, the adaptor assembly is configured for mounting one or a pair of circumaural devices to a helmet using a helmet accessory mounting system. Examples of helmets incorporating suitable mounting systems include the Team Wendy helmet and the Ops Core helmet.

It will be recognized that the present development is not limited to use with circumaural communications devices and rather may be used in connection with any adjustable helmet-mountable devices, such as night vision devices or head up displays (HUDs).

SUMMARY

An adapter assembly for attaching a circumaural device to a mounting interface on a helmet comprises a fastener element configured to releasably couple to the mounting interface. A pressure relief assembly is coupled to the fastener element and has a pivoting subassembly and an adjustment subassembly. The pivoting subassembly is pivotable about a pivot axis and has a range of travel between an upright position and an extended position. One or more attachment arms have a proximal end coupled to the pressure relief assembly and a distal end for attaching the circumaural device. The adjustment subassembly has a manually operable control portion to cause pivoting movement of the pivoting subassembly, wherein pivoting movement of the pivoting subassembly toward the upright position decreases a pressure of an attached circumaural device on a wearer's head when the wearer dons the adapter assembly, and wherein pivoting movement of the pivoting subassembly toward the extended position increases a pressure of an attached circumaural device on the wearer's head when the wearer dons the adapter assembly.

In a more limited aspect, the one or more attachment arms provide a spring bias of the circumaural device toward the wearer's head when the wearer dons the adapter assembly.

In another more limited aspect, the circumaural device comprises an ear cup.

In yet another more limited aspect, the ear cup comprises an annular cushion.

In still another more limited aspect, the one or more attachment arms comprise a yoke having a center portion extending generally parallel to the pivot axis and two arms extending from opposite ends of the center portion.

In another more limited aspect, the adapter assembly further comprises an ear cup attached to the distal end of the one or more attachment arms.

In another more limited aspect, the ear cup is releasably attached to the distal end of the one or more attachment arms.

In another more limited aspect, the ear cup is selected from an audio speaker device and hearing protection device.

In another more limited aspect, the range of travel between the upright position and the extended position is 30 degrees.

In another more limited aspect, a position of the adjustment subassembly is continuously adjustable between the upright position and the extended position.

In another more limited aspect, the adjustment subassembly comprises a manually rotatable worm screw which is rotatable to selectively advance or retract an actuator, and, at least a portion of the actuator rides in a slot in a housing of the pivoting subassembly to cause pivoting movement of the pivoting subassembly toward the upright position when the worm screw is rotated in a first direction and to cause pivoting movement of the pivoting subassembly toward the extended position when the worm screw is rotated in a second direction opposite the first direction.

In another more limited aspect, the adjustment subassembly includes a housing having a movable housing portion and a fixed housing portion, and, a threaded receptacle is disposed within the fixed housing portion. The threaded receptacle receives a threaded rod having an enlarged diameter portion, the enlarged diameter portion disposed within the movable housing portion. The enlarged diameter portion is manually rotatable to selectively advance the threaded rod portion with respect to the threaded receptacle when the enlarged diameter portion is rotated in a first direction and retract the threaded rod portion with respect to the threaded receptacle when the enlarged diameter portion is rotated in a second direction opposite the first direction, such that rotating the enlarged diameter portion in the first direction causes the pivoting subassembly to pivot about the pivot axis toward the upright position and rotating the enlarged diameter portion in the second direction causes the movable housing portion to pivot toward the extended position.

In another more limited aspect, the enlarged diameter portion extends through an aperture in the movable housing portion.

In another more limited aspect, the adapter assembly further comprises a lever disposed within the movable housing and pivotally coupled to the one or more arms. The one or more arms and the lever cooperate to define an over-center toggle linkage to allow pivoting movement of the one or more arms with respect to the movable housing between a disengaged position and an engaged position.

In another more limited aspect, the one or more attachment arms comprise a yoke having a center portion extending generally parallel to the pivot axis and two arms extending from opposite ends of the center portion.

In another more limited aspect, the center portion is pivotally attached to an end of the lever.

In another more limited aspect, the adjustment subassembly includes a housing having a movable housing portion and a fixed housing portion. A sliding actuator member is received through an elongate transverse aperture in the fixed housing portion, the elongate transverse aperture extending generally parallel to the pivot axis. The sliding actuator engages with a groove in the movable housing portion, the groove extending at an angle with respect to the pivot axis, such that sliding the sliding actuator in a first direction causes the movable housing portion to pivot toward the upright position, and, sliding the sliding actuator in a second direction opposite the first direction causes the movable housing portion to pivot toward the extended position.

In another more limited aspect, the adapter assembly further comprises a lever disposed within the movable housing and pivotally coupled to the one or more arms. The one or more arms and the lever cooperate to define an over-center toggle linkage to allow pivoting movement of the one or more arms with respect to the movable housing between a disengaged position and an engaged position.

In another more limited aspect, the one or more attachment arms comprise a yoke having a center portion extending generally parallel to the pivot axis and two arms extending from opposite ends of the center portion.

In another more limited aspect, the center portion is pivotally attached to an end of the lever.

BRIEF DESCRIPTION OF THE DRAWINGS

The invention may take form in various components and arrangements of components, and in various steps and arrangements of steps. The drawings, which are not necessarily to scale, are only for purposes of illustrating preferred embodiments and are not to be construed as limiting the invention.

FIGS. 121 and 12J are side cross-sectional views of the adaptor assembly appearing in FIG. 7B in reduced and increased pressure positions, respectively.

FIGS. 120 and 12Q are top views of the adaptor assembly appearing in FIG. 7B in a reduced pressure position.

FIGS. 131 and 13J are side cross-sectional views of the adaptor assembly appearing in FIG. 10A in reduced and increased pressure positions, respectively.

FIGS. 130 and 13Q are top views of the adaptor assembly appearing in FIG. 10A in a reduced pressure position.

DETAILED DESCRIPTION OF THE PREFERRED EMBODIMENTS

Figure 1:
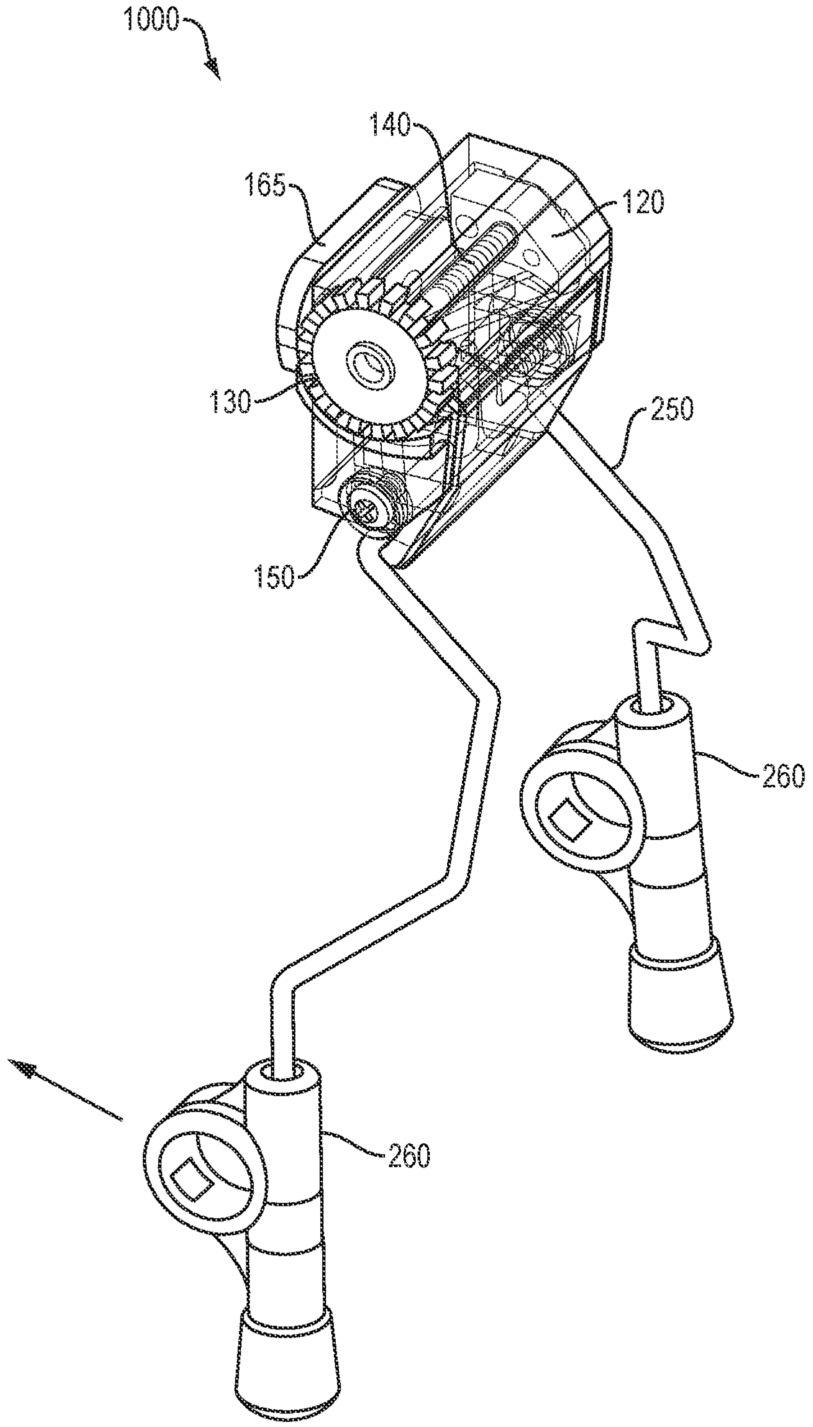
FIG. 1 is an isometric view of an adaptor assembly having an adjustment subassembly and a pressure-relief subassembly in accordance with a first embodiment.

Referring now to the drawings, FIGS. 1-5, 6A, 6B, 7A, 7B, 8A, 8B, 9A-9E, 10A, 10B, 11A-11E, 12A-12R, and 13A-13R illustrate exemplary adaptor assemblies for a helmet-mountable circumaural device.

The terms "a" or "an," as used herein, are defined as one or more than one. The term "another," as used herein, is defined as at least a second or more. Unless the context clearly requires otherwise, throughout the description and the claims, the words "comprise," "comprises," "comprising," and the like, as well as the words "include," "includes," "including," "has,", "have,", "having", and the like are to be construed in an inclusive sense as opposed to an exclusive or exhaustive sense; that is to say, in the sense of "including, but not limited to." The term "coupled" or "operatively coupled," as used herein, is defined as indirectly or directly connected. All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

Figure 2:
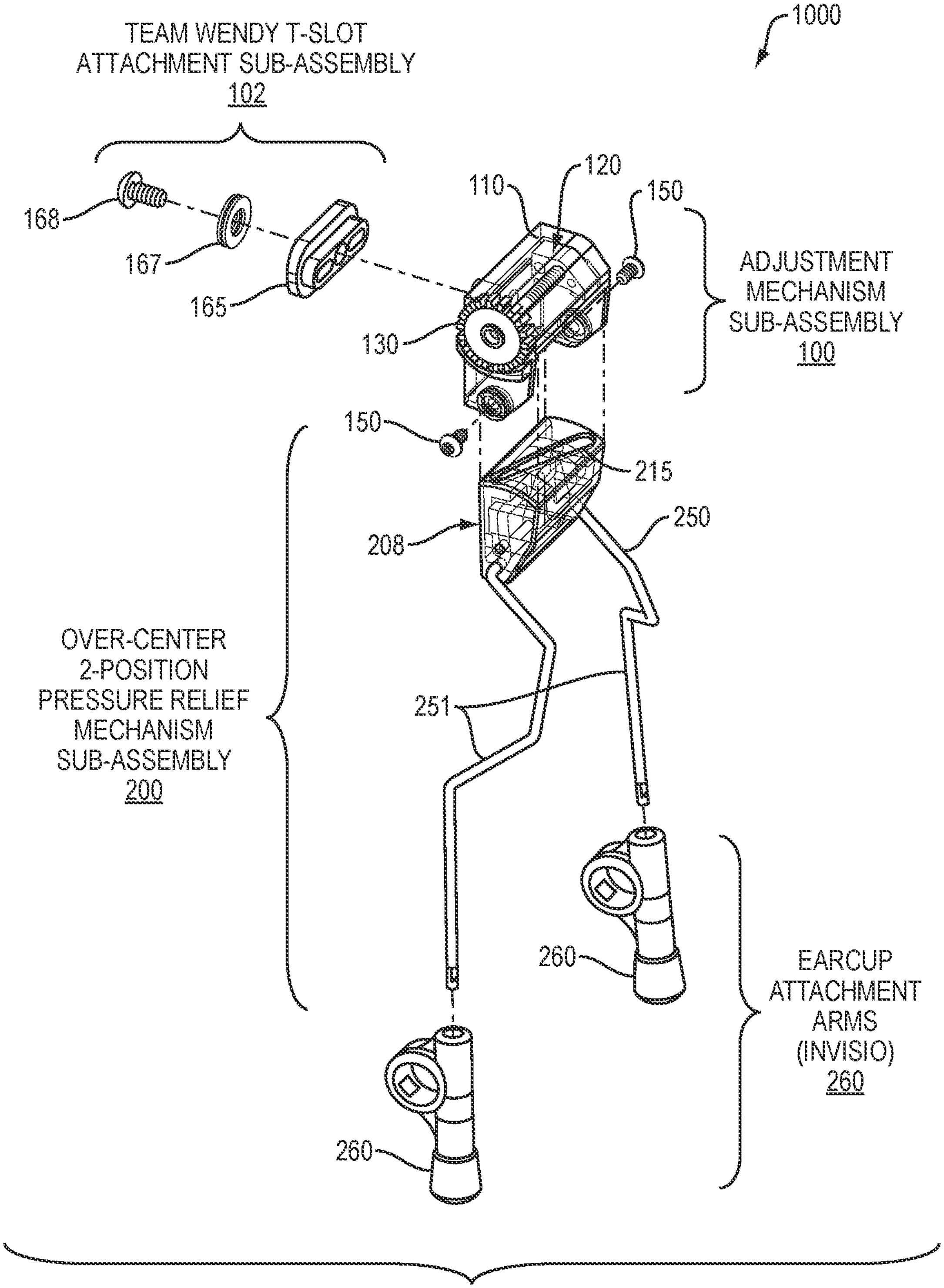
FIG. 2 is an exploded view of the adaptor assembly appearing in FIG. 1.

FIG. 1 illustrates an exemplary adaptor assembly, generally designated 1000, for a helmet. As best seen in FIG. 2, the adaptor assembly 1000 may generally include an adjustment subassembly, generally designated 100, and a pressure relief subassembly, generally designated 200.

Figure 3:
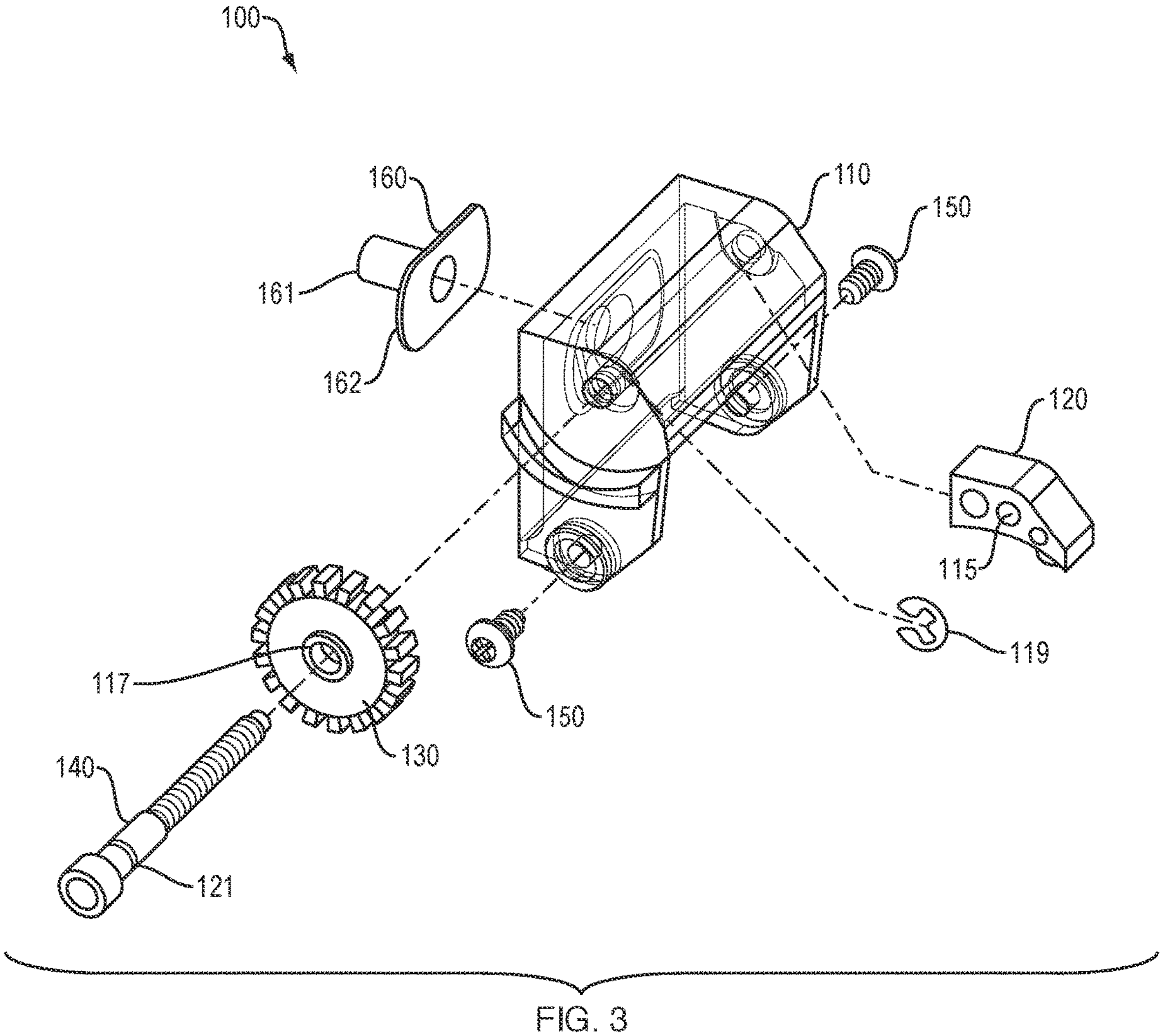
FIG. 3 is an exploded view of the adjustment subassembly of the adaptor assembly appearing in FIG. 1.

Referring now to FIG. 3, the adjustment subassembly 100 includes a shell portion 110. In the illustrated embodiment of FIG. 3, the adjustment subassembly 100 remains in a fixed position relative to the helmet. In certain embodiments, the shell is formed of 30% glass-filled (GF) nylon. The shell portion 110 houses a sliding actuator 120 and a worm screw 140, wherein one end of the worm screw 140 extends perpendicularly through an opening 117 in an adjustment wheel 130. The worm screw 140 and wheel 130 are rotatably secured to the shell portion 110 by a spring clip 119 engaging an annular channel 121. In certain embodiments, the entirety of the adjustment wheel 130 is external to the shell 110 (see, for example, FIGS. 6A and 6B). In alternative embodiments, the adjustment wheel 130 may be disposed within the housing 110 with a portion extending through an opening in the housing to allow manual rotation.

The end of the worm screw 140 extends through the shell 110 and is attached to the wheel 130. In certain embodiments, the adjustment wheel 130 may be formed of 30% GF nylon. In certain embodiments, the worm screw 140 is fixedly attached to the adjustment wheel 130 such that rotating the adjustment wheel 130 in either direction rotates the worm screw 140 in the same direction. In certain embodiments, the worm screw 140 extends perpendicularly through a threaded opening 115 in the sliding actuator 120. In certain embodiments, the sliding actuator 120 is a cam adjustment actuator formed of an aluminum alloy, such as 7075 aluminum. The threaded opening 115 in the sliding actuator 120 is configured to rotatably engage with the worm screw 140 such that rotation of the worm screw 140 causes the sliding actuator 120 to move along the length of the worm screw 140. In certain embodiments, a portion of the sliding actuator 120 is configured to engage with an angled straight or arcuate groove 215 in a housing portion 208 of the pressure relief subassembly 200.

Figure 4:
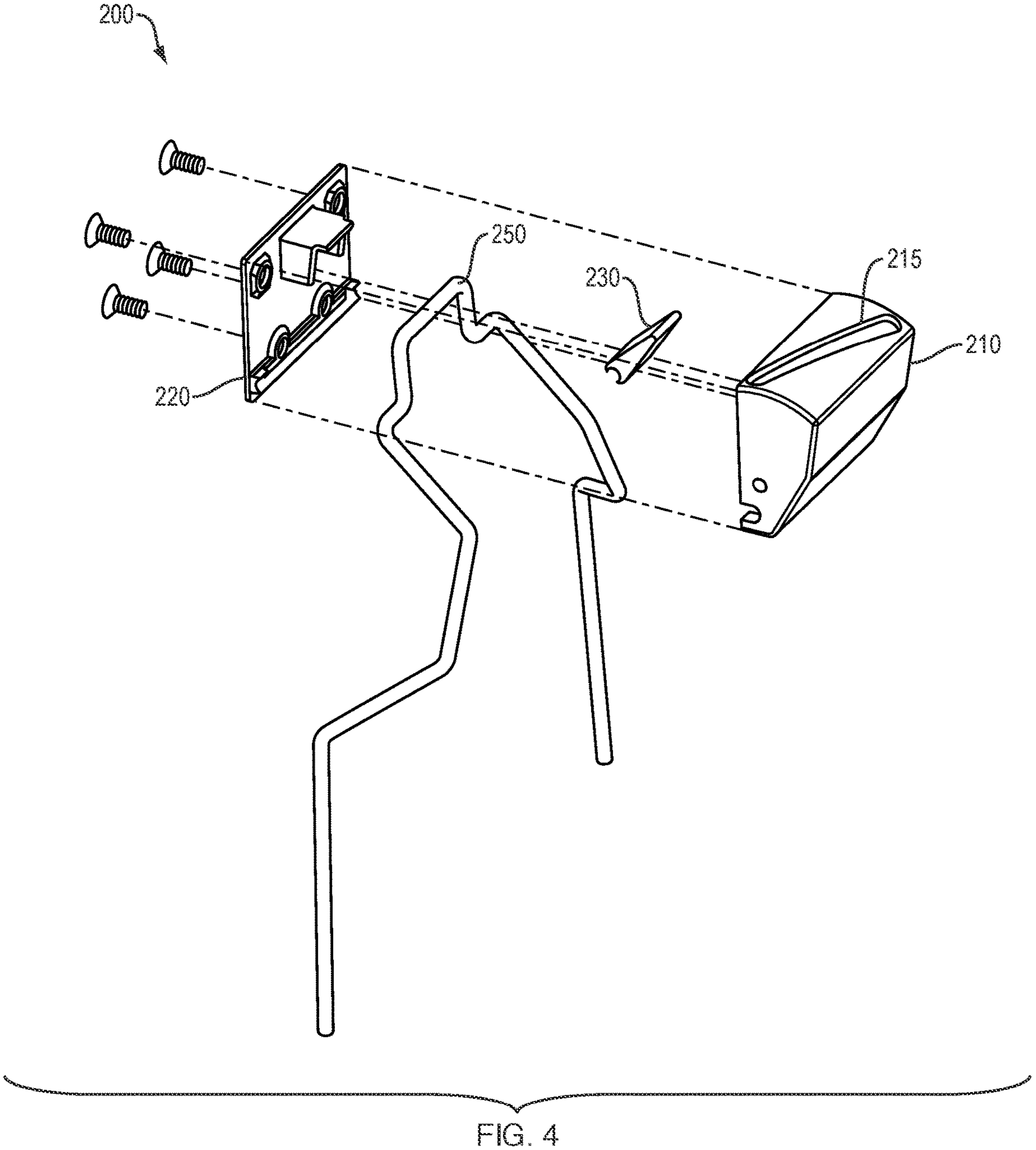
FIG. 4 is an exploded view of the pressure relief subassembly of the adaptor assembly appearing in FIG. 1.

Referring now to FIG. 4, the pressure relief subassembly 200 includes the housing 208 which, in certain embodiments is movable relative to the adjustment subassembly 100. The pressure relief subassembly 200 encloses a lever 230 and an upper or proximal end of a yoke 250. In certain embodiments, the lever 230 is formed of 30% GF nylon. In certain embodiments, the yoke 250 is a steel wire yoke, forming two spring arm portions 251, each spring arm portion having an ear cup attachment portion 260 (see, for example, FIG. 2) attached thereto at the lower or distal end thereof for attaching the ear cup portion 118 (see FIG. 7A) of a circumaural device 122 (see FIG. 7A), such as an over the ear head phone, over the ear hearing protector, or the like. In embodiments, the circumaural device 122 is a part of a communications headset, which may optionally further include a microphone 124 and boom arm 126 (see FIG. 7A). In embodiments, the ear cup 118 includes a cushion 128 which contacts the user's head and surrounds the user's ear.

In certain embodiments, the housing 208 of the pressure relief subassembly 200 is comprised of an outer housing portion 210 and an inner housing portion 220. In certain embodiments, either or both of the outer housing portion 210 and inner housing portion 220 are formed of 30% GF nylon. In certain embodiments, the outer housing portion 210 and inner housing portion 220 are configured to pivotally receive upper end of the wire yoke 250. The outer housing portion 210 includes a grooved or channel 215. In certain embodiments, the groove 215 extends diagonally across the length of the outer top surface of the outer housing portion 210.

In certain embodiments, the upper portion of the pressure relief subassembly housing 208 is pivotally attached to adjustment subassembly 100 by one or more fasteners 150. When the sliding actuator 120 of the adjustment subassembly is rotatably engaged by the worm screw 140, the movement of the sliding actuator 120 along the groove or channel 215 engages the movable housing portion 208 to move or tilt inwardly toward or outwardly away from the adjustment subassembly 100, relative to the direction and rotation of the worm screw 140.

The pressure relief subassembly 200 further includes an over-center mechanism, where the wire yoke 250 is a pivoting structure configured to engage with the lever 230. Depending on the general direction of the adjustment of the pressure relief subassembly outwardly or inwardly from the adjustment subassembly, the engagement of the lever 230 against the yoke 250 will pivot the spring arm portions of the yoke 250 inwardly (creating more pressure of a circumaural device against the head) or outwardly (allowing for less pressure or to release the circumaural device from against the head).

Figure 5:
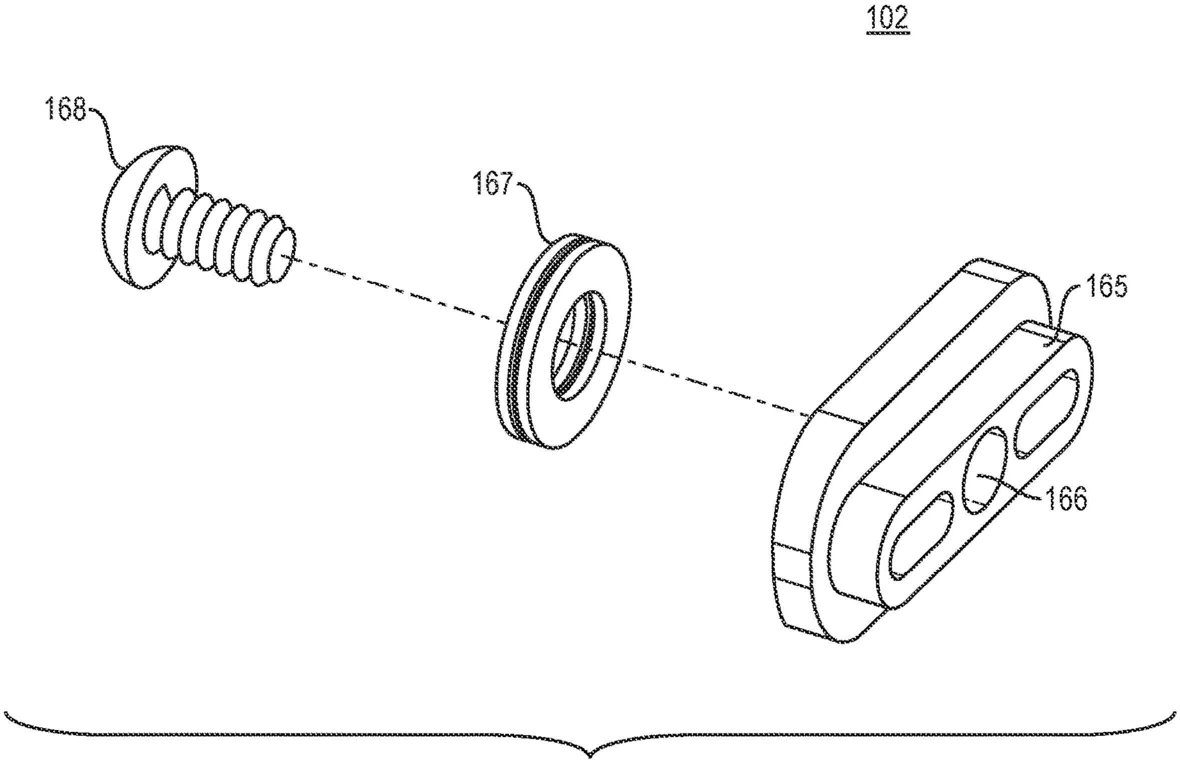
FIG. 5 is an exploded view of a T-slot attachment subassembly of the adaptor assembly appearing in FIG. 1.
Figure 7B:
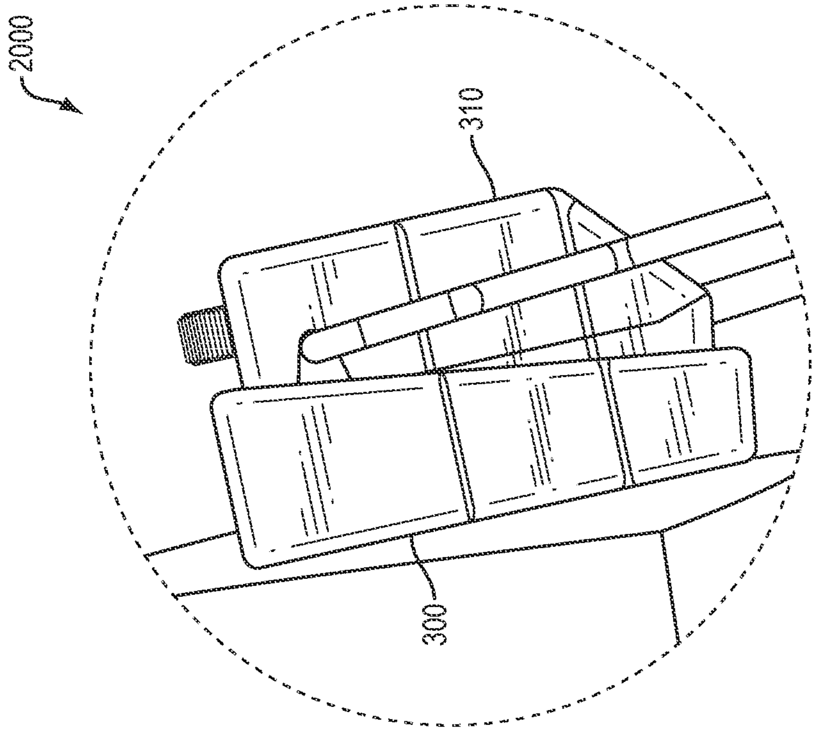
FIG. 7B is an enlarged view of the region 7B appearing in FIG. 7A.
Figure 7A:
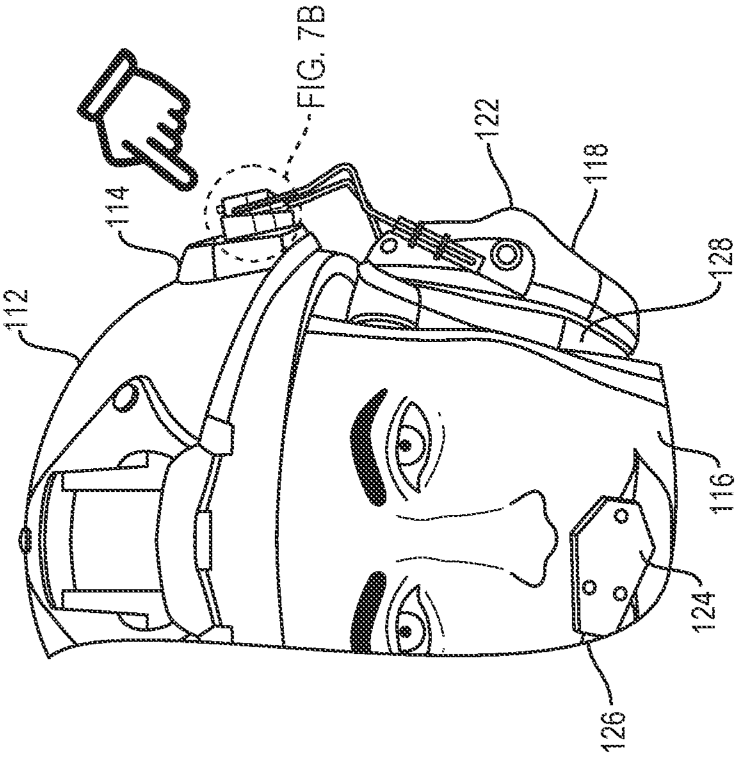
FIG. 7A is a fragmentary front view of a user and helmet having an adaptor assembly having a dial adjustment mechanism in accordance with a second embodiment.
Figure 8A:
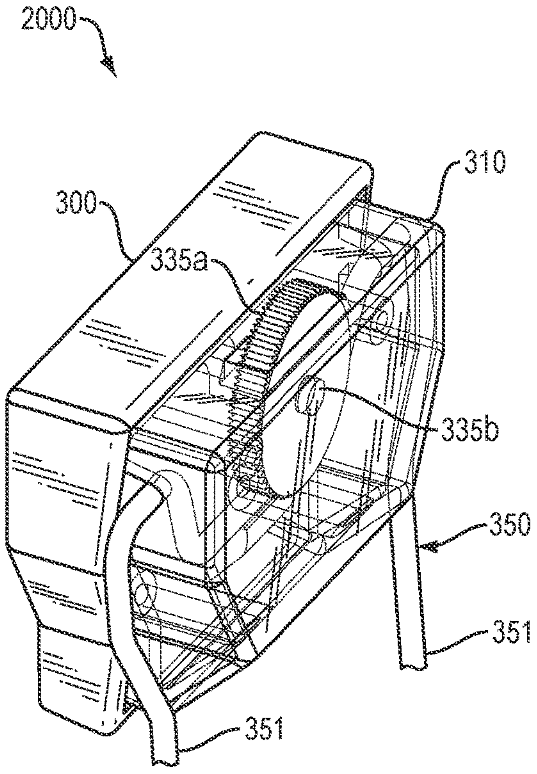
FIG. 8A is an isometric view of the adaptor assembly appearing in FIG. 7B in a reduced pressure position.
Figure 8B:
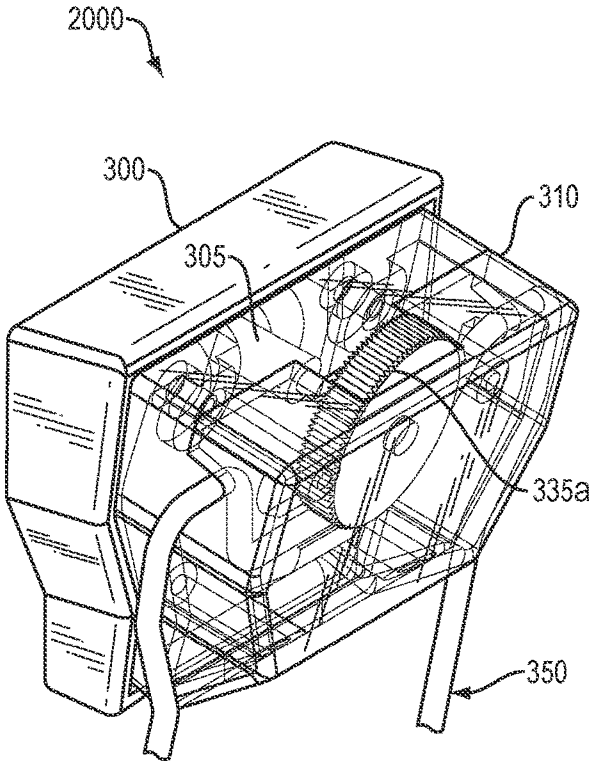
FIG. 8B is an isometric view of the adaptor assembly appearing in FIG. 7B in an increased pressure position.
Figure 9A:
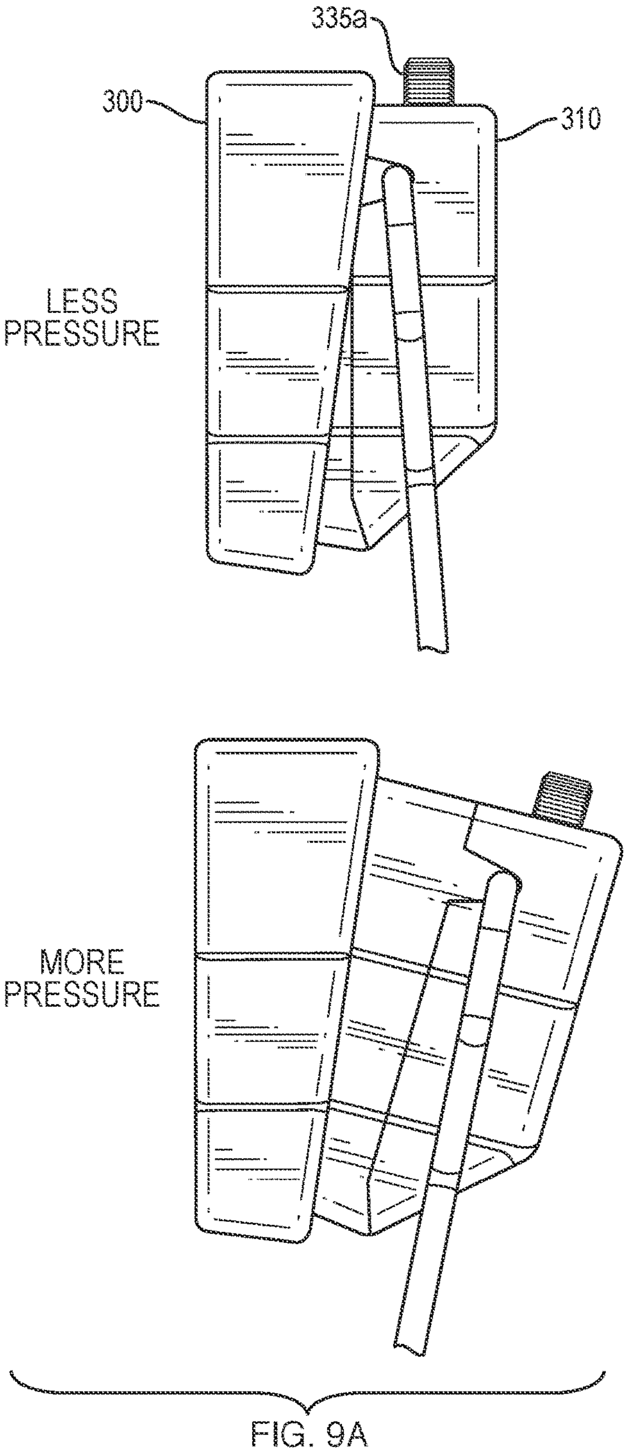
FIG. 9A is a set of comparative side views of the adaptor assembly appearing in FIG. 7B in reduced and increased pressure positions.
Figure 9B:
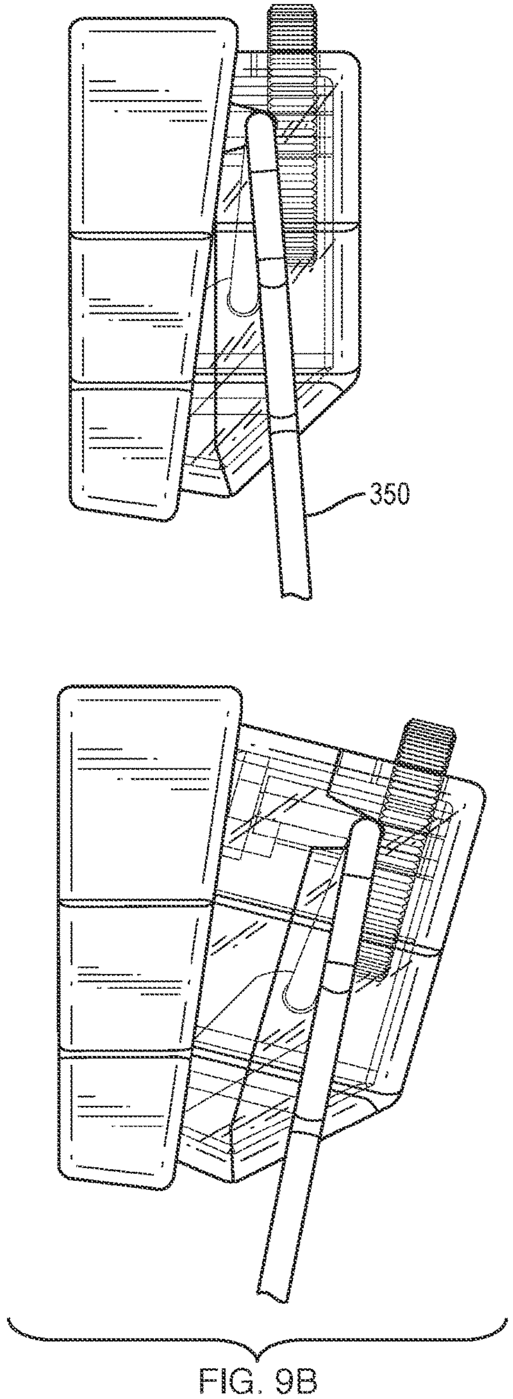
FIG. 9B is a set of comparative side views of the adaptor assembly appearing in FIG. 7B in reduced and increased pressure positions.
Figure 9C:
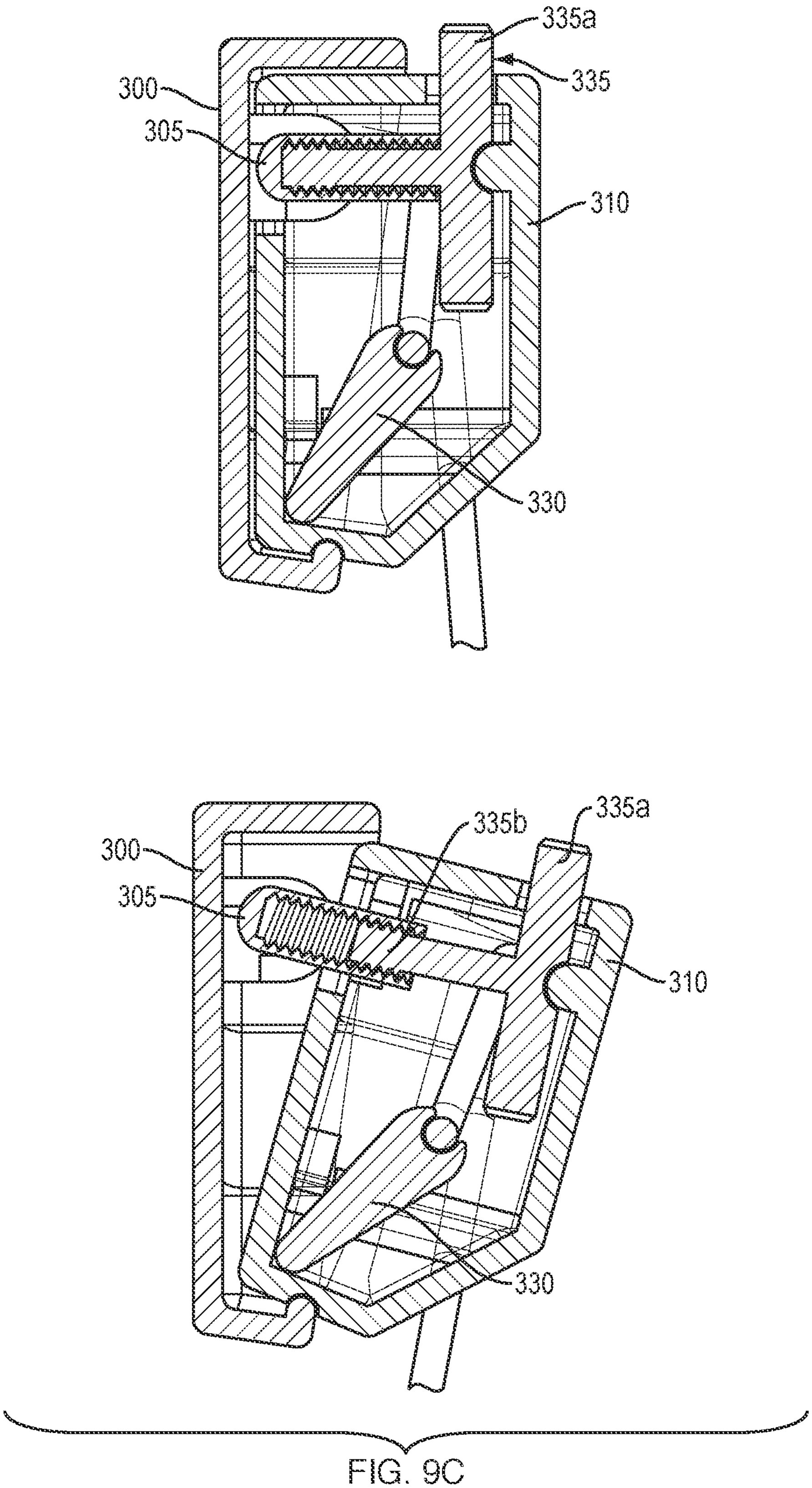
FIG. 9C is a set of comparative side cross-sectional views of the adaptor assembly appearing in FIG. 7B in reduced and increased pressure positions.
Figure 9D:
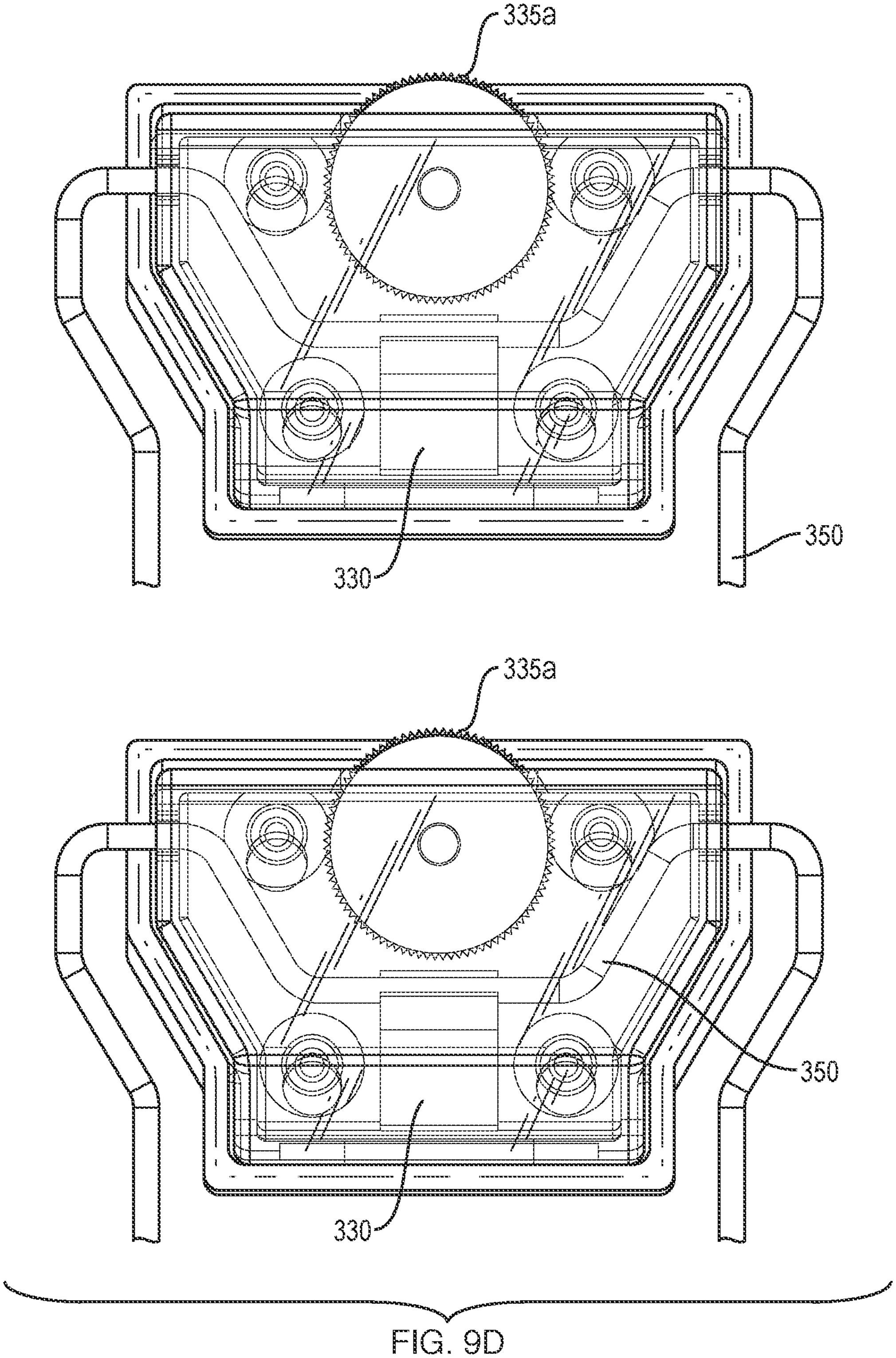
FIG. 9D is a set of comparative front views of the adaptor assembly appearing in FIG. 7B in reduced and increased pressure positions.
Figure 9E:
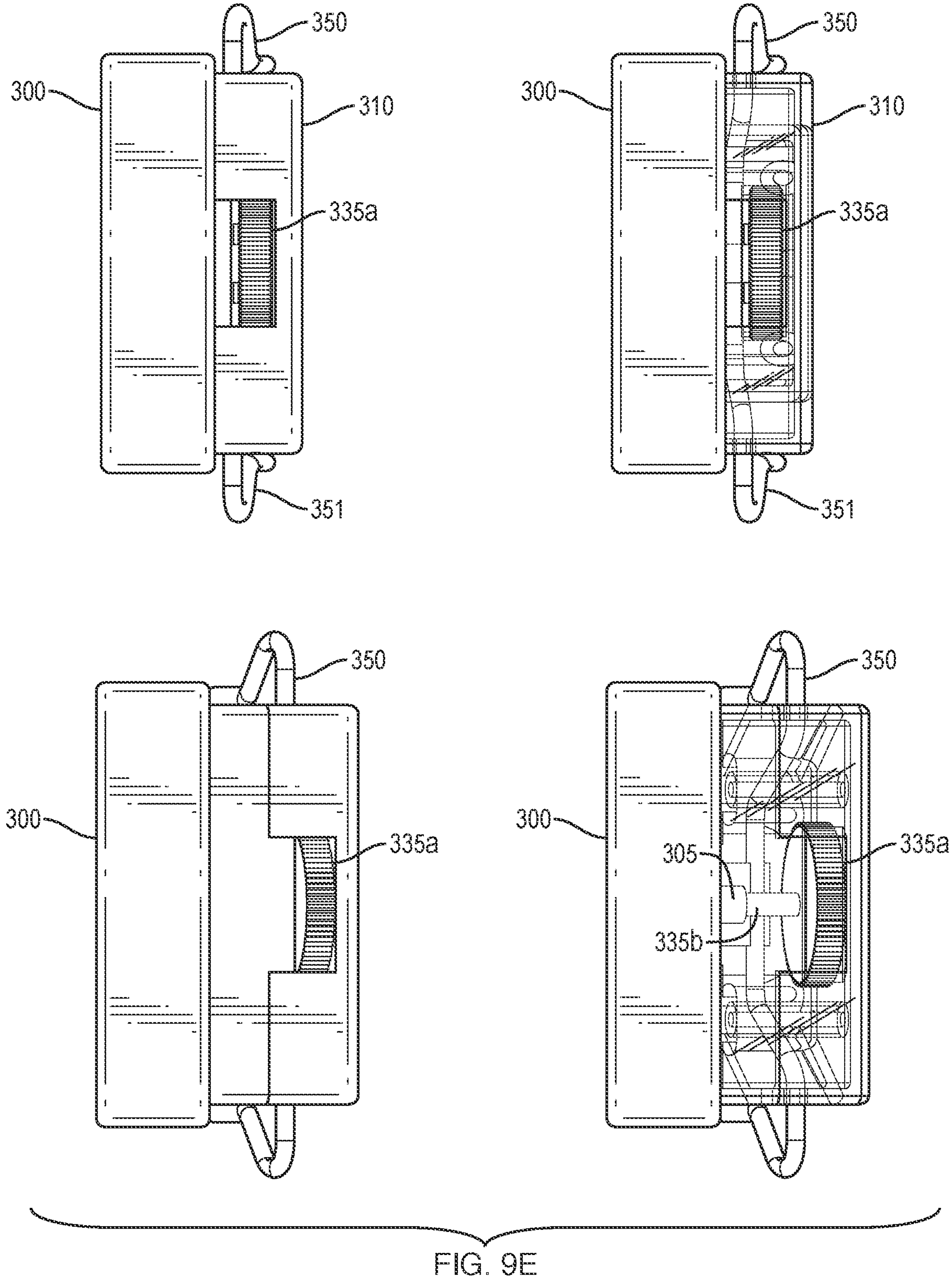
FIG. 9E is a set of comparative top views of the adaptor assembly appearing in FIG. 7B in reduced and increased pressure positions.
Figure 10A:
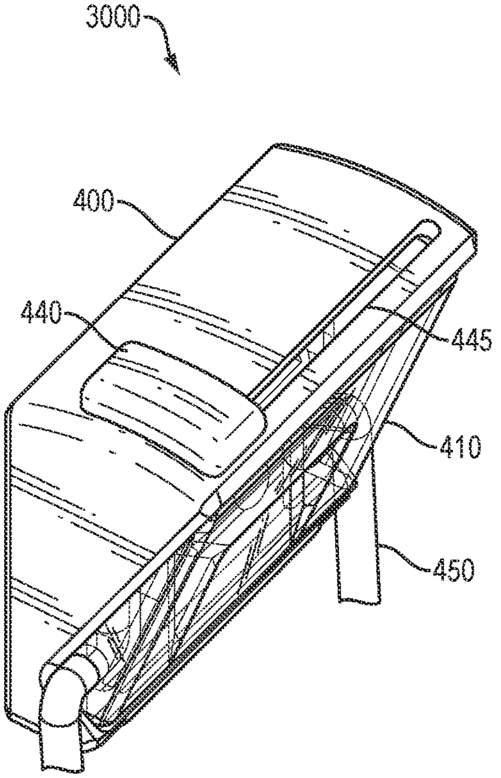
FIG. 10A is an isometric view of an adaptor assembly having a sliding adjustment mechanism in accordance with a third embodiment in a reduced pressure position.
Figure 10B:
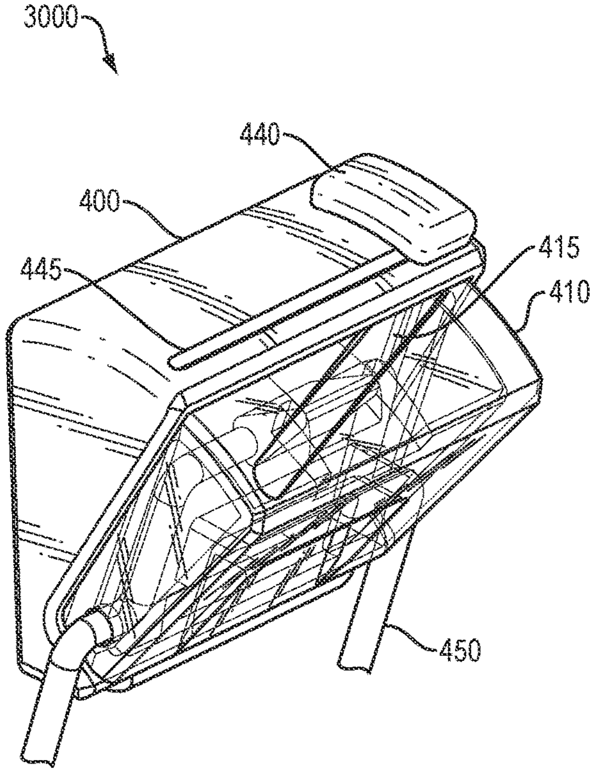
FIG. 10B is an isometric view of the adaptor assembly having a sliding adjustment mechanism appearing in FIG. 10A in an increased pressure position.
Figure 11A:
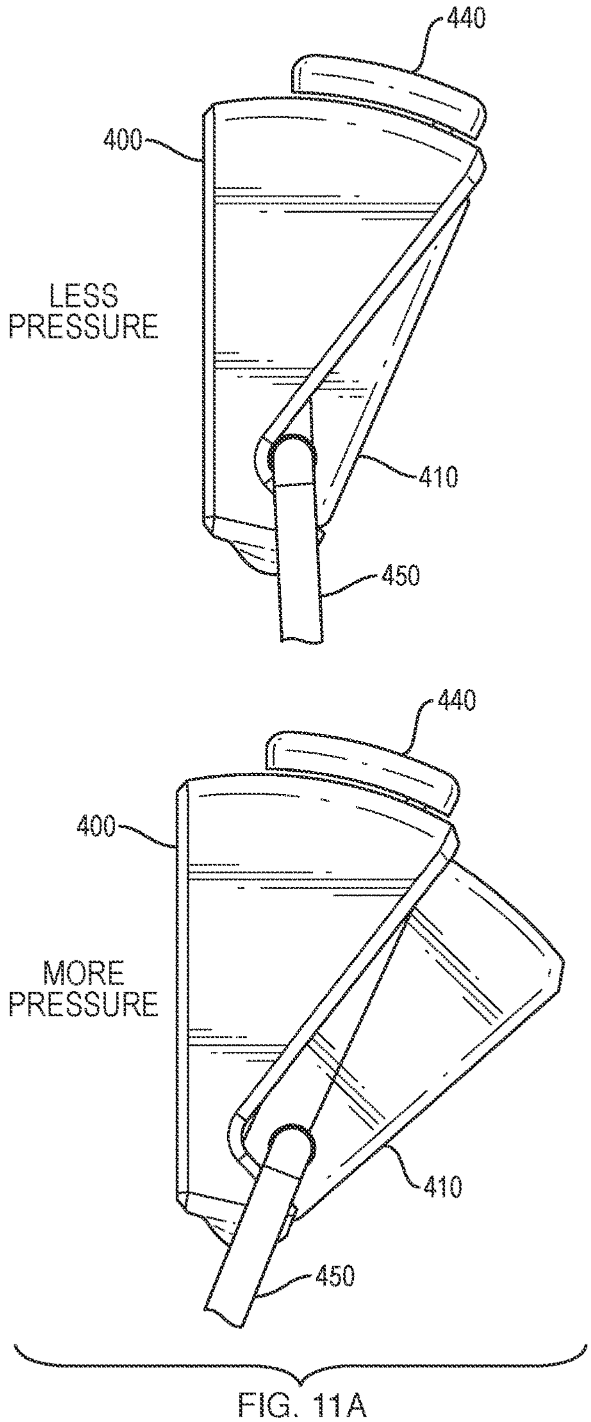
FIG. 11A is a set of comparative side views of the adaptor assembly appearing in FIG. 10A in reduced and increased pressure positions.
Figure 11B:
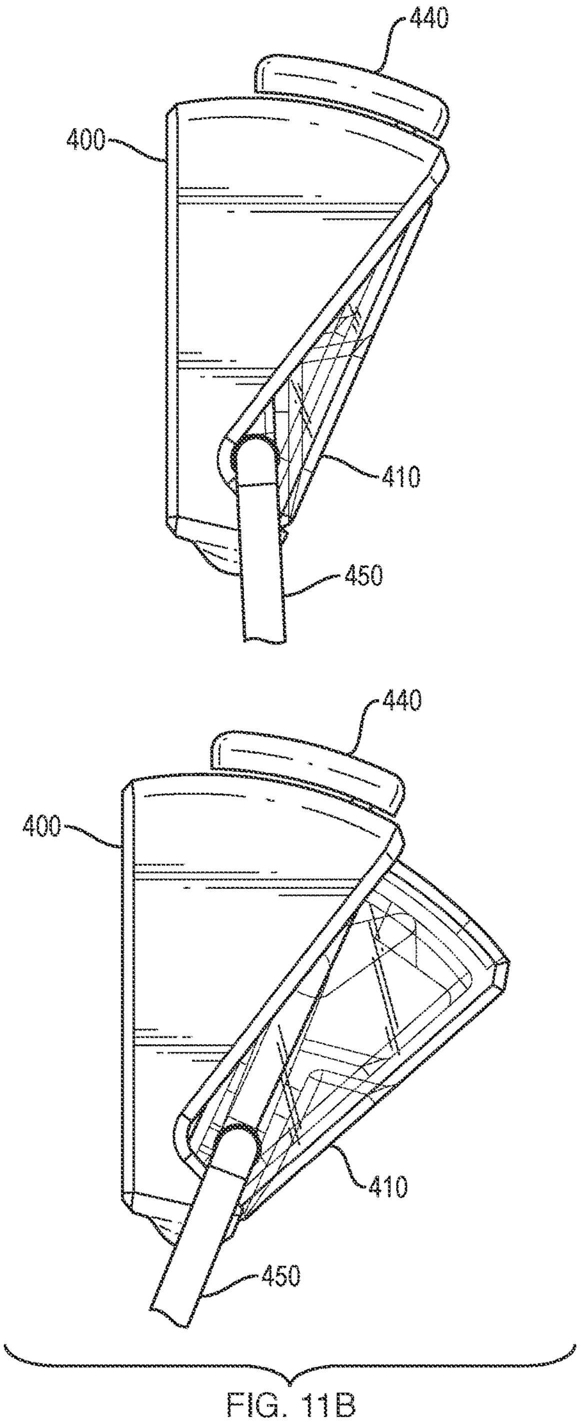
FIG. 11B is a set of comparative side views of the adaptor assembly appearing in FIG. 10A in reduced and increased pressure positions.
Figure 11C:
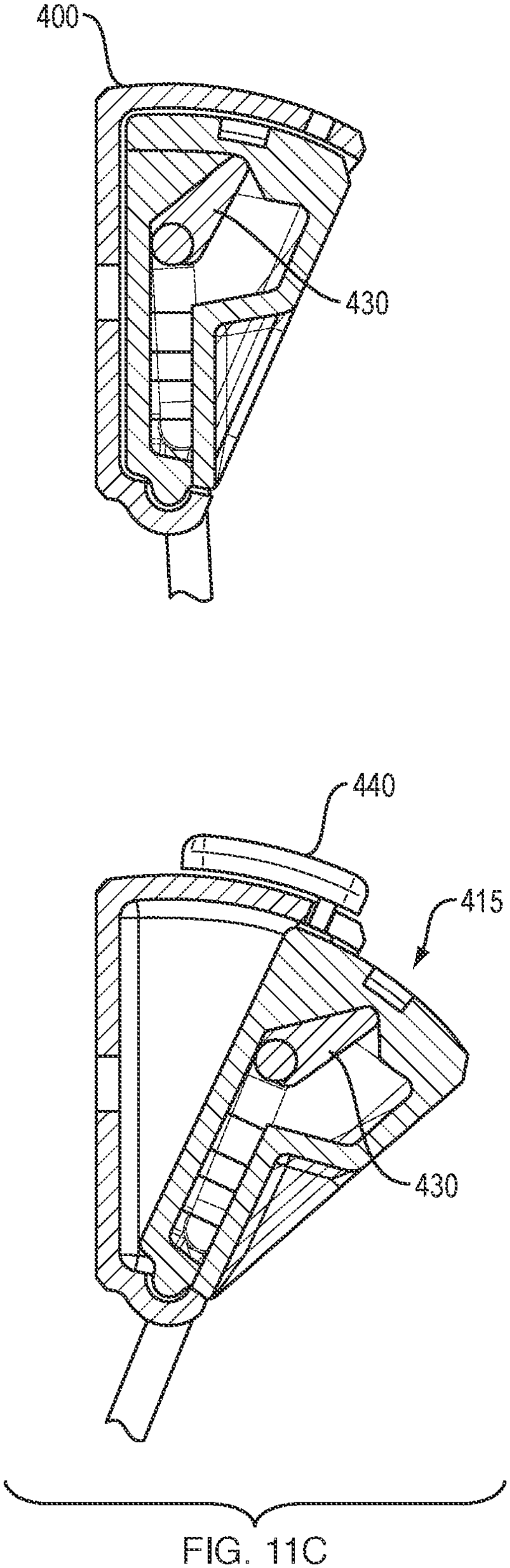
FIG. 11C is a set of comparative side cross-sectional views of the adaptor assembly appearing in FIG. 10A in reduced and increased pressure positions.
Figure 11D:
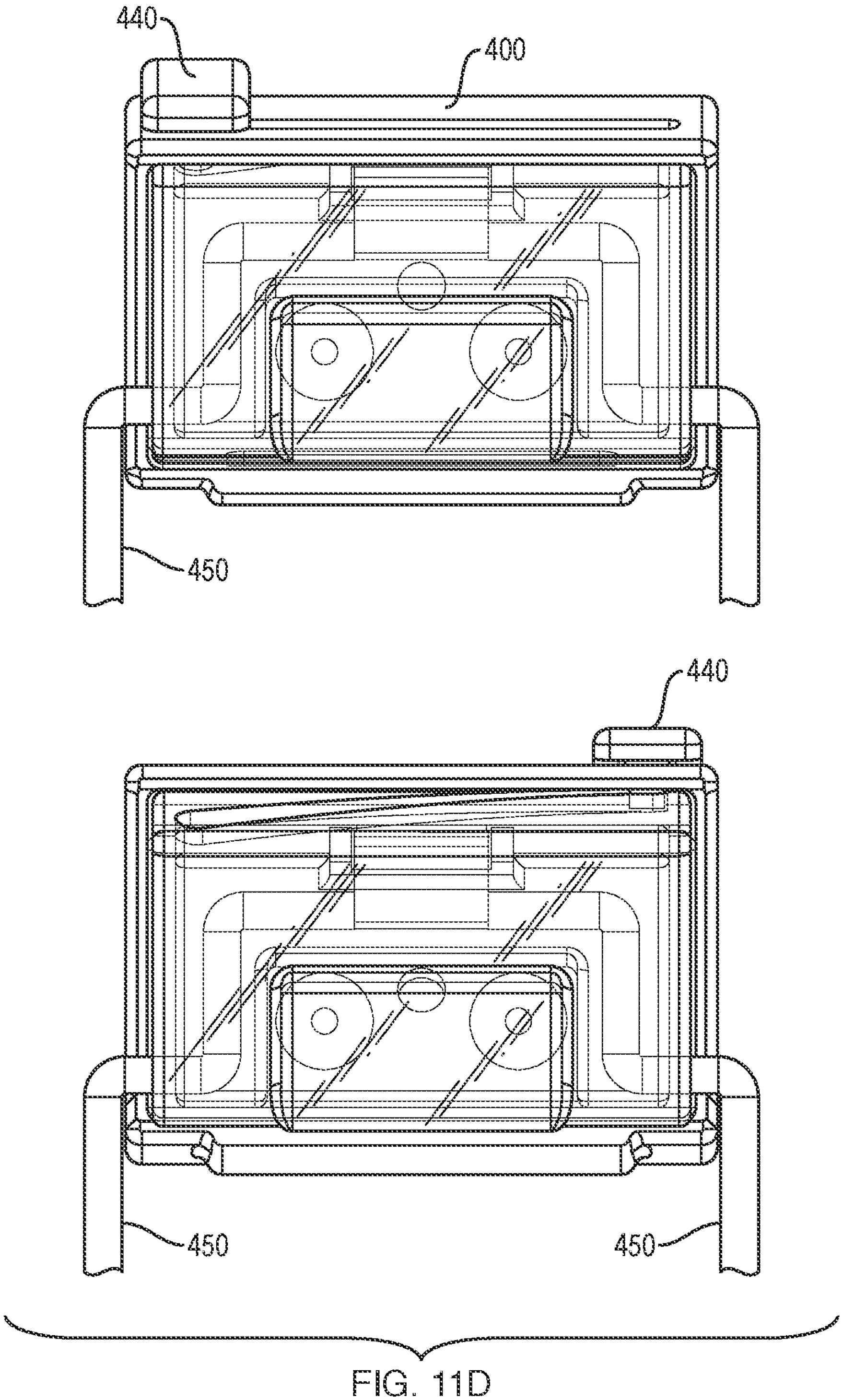
FIG. 11D is a set of comparative front views of the adaptor assembly appearing in FIG. 10A in reduced and increased pressure positions.
Figure 11E:
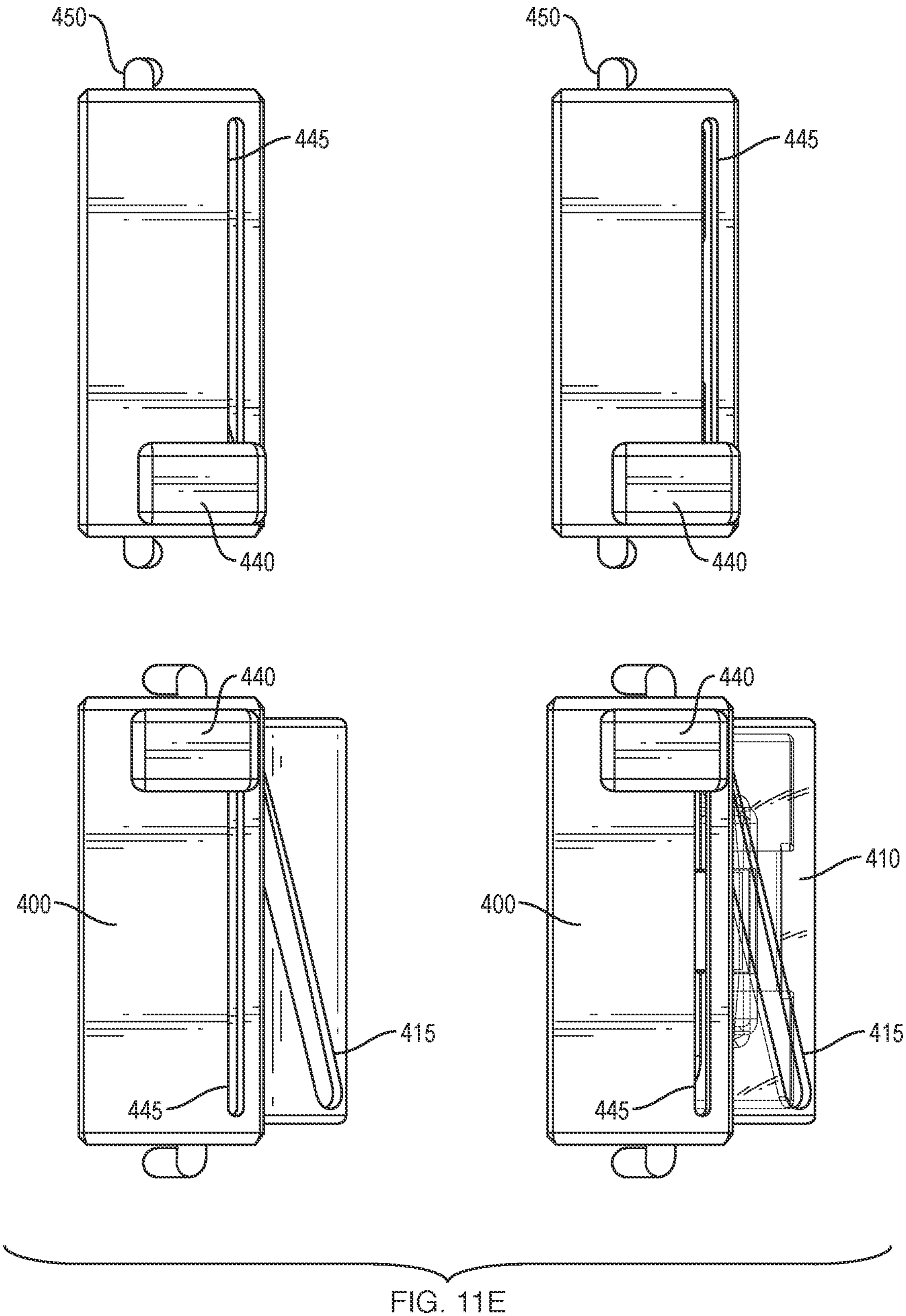
FIG. 11E is a set of comparative top views of the adaptor assembly appearing in FIG. 10A in reduced and increased pressure positions.

FIG. 5 illustrates an exemplary subassembly for attachment of the adaptor assembly 1000 to a helmet 112 (see FIG. 7A) via a helmet accessory mounting system 114 (see FIG. 7A). In certain embodiments, the helmet accessory mounting system 114 is a rail mount system. The attachment subassembly is equally applicable to the other adaptor assembly embodiments herein. Although only one circumaural device is illustrated in FIG. 7A, in embodiments, a second circumaural device (not shown) may be mounted to the opposite lateral side of the helmet 112 via a second helmet accessory mount and a second adapter assembly, e.g., in a mirrored configuration to the helmet mount 114 and adapter assembly (1000, 2000, 3000) as illustrated.

In the illustrated embodiment, an internally threaded post 161 of a T-nut 160 having a threaded opening is inserted through an aperture in the shell 110 of the adjustment subassembly 100, such that the head portion 162 of the T-nut 160 is retained inside the shell 110. The post 161 of the T-nut 160 is received in a central opening 166 in a T-slot anchor portion 165 of an attachment subassembly 102. A threaded fastener 168 is secured to the threaded opening of the T-nut post 161. A spring washer or similar lock washer 167 is disposed between the head of the T-slot anchor 165 to prevent inadvertent undesired loosening of the fastener 168. In the illustrated embodiment, the T-slot anchor is of a type that is compatible with helmet accessory mounting systems available from Team Wendy, LLC, of Cleveland, Ohio. It will be recognized, however, that the attachment subassembly may be adapted for use with all manner of helmet accessory retention systems.

Figure 6A:
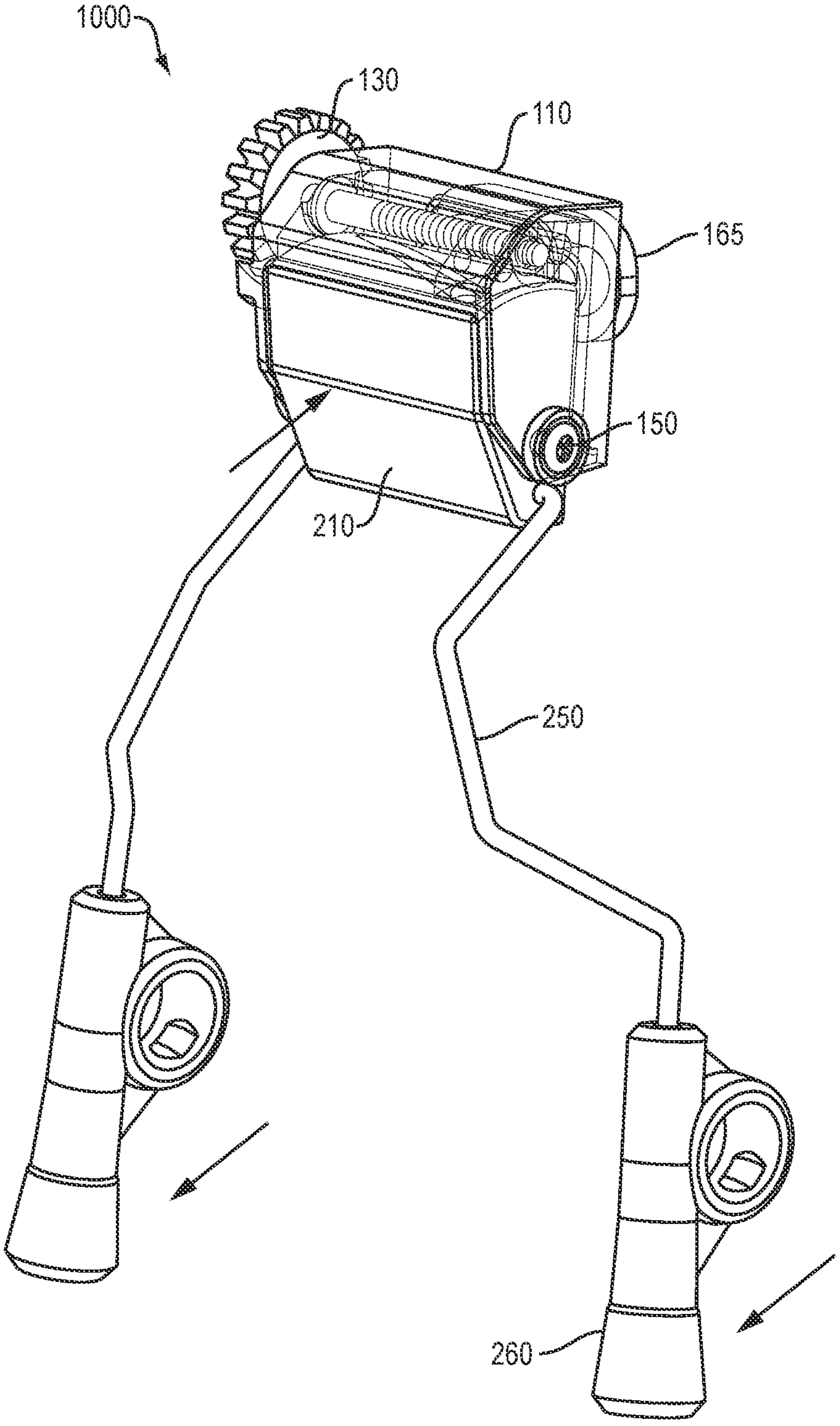
FIG. 6A is an isometric view of the adaptor assembly appearing in FIG. 1 in a reduced pressure position.
Figure 6B:
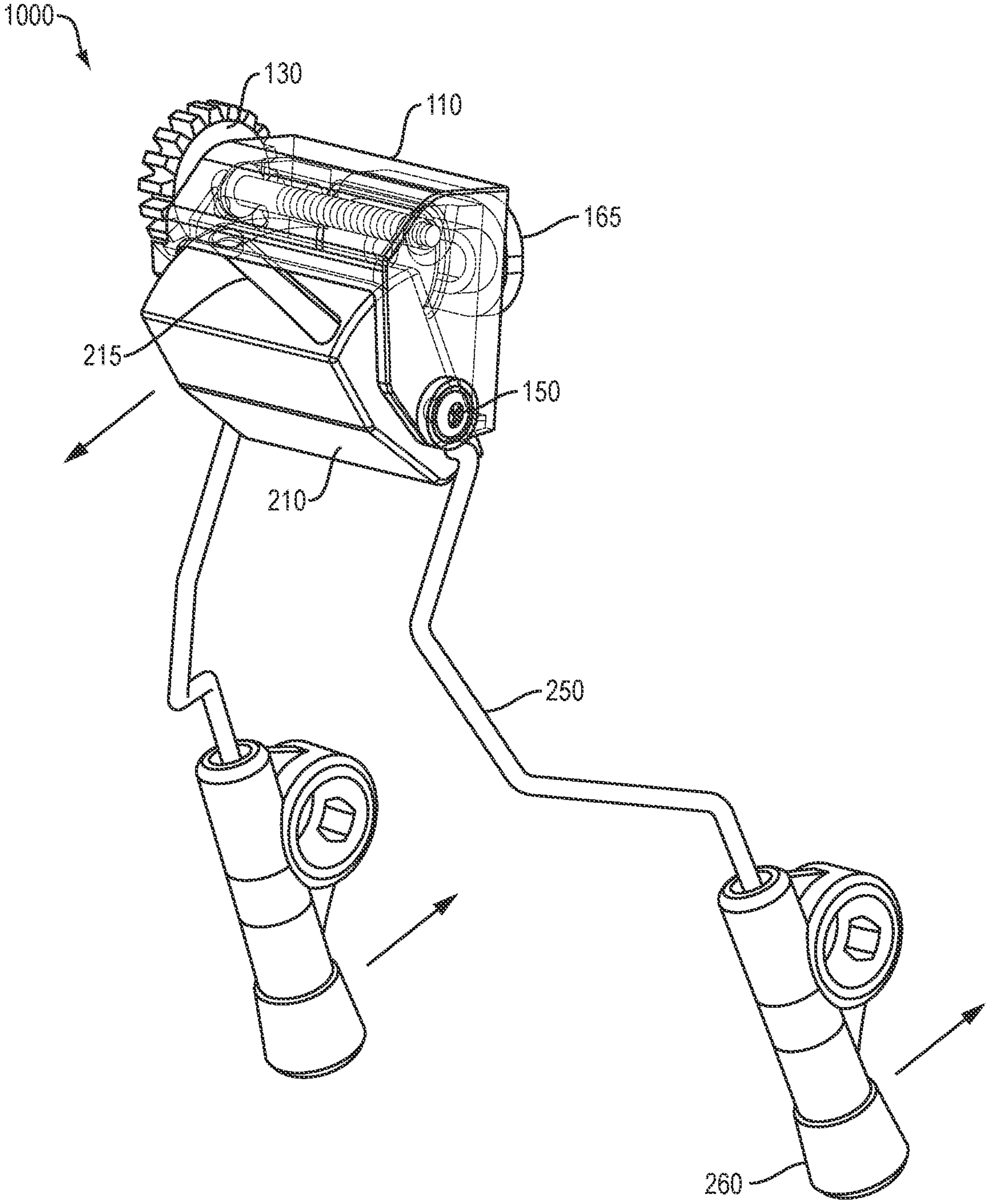
FIG. 6B is an isometric view of the adaptor assembly appearing in FIG. 1 in an increased pressure position.

FIGS. 6A and 6B illustrate an exemplary adaptor assembly 1000, showing the slider at a first end of the range of travel providing less pressure (FIG. 6A) and as adjusted to a second end of the range of travel providing increased pressure (FIG. 6B). In the illustrated embodiment, a 30-degree range of adjustment is provided, although other ranges of travel are contemplated. In embodiments, a range of travel between 15 and 45 degrees, e.g., 15 degrees, 20, degrees, 25 degrees, 30 degrees, 35 degrees, 40 degrees, 45 degrees, and so forth. In this and other embodiments, when the pressure relief subassembly is at the first end of the range of travel, i.e., in the reduced pressure position, it will be said to be in the upright or upright position, and, when the pressure relief subassembly is at the second end of the range of travel, i.e., in the reduced pressure position, it will be said to be in the extended or fully extended position.

FIG. 7A illustrates a helmet 112 having a helmet accessory mounting system 114. The helmet 112 is donned by a user 116. The helmet accessory mounting system 114 appears with a second embodiment adaptor assembly 2000 coupled thereto. It will be recognized that the helmet 112 and helmet accessory mounting system 114 are equally applicable to the other adapter assembly embodiments herein (e.g., adapter assembly embodiments 1000 and 3000).

In a second embodiment, shown in FIGS. 7A, 7B, 8A, 8B, 9A-9E, and 12A-12R, the adaptor assembly, generally designated 2000, includes a dial adjustment mechanism for pressure relief and fit adjustment. The adaptor assembly 2000 includes a fixed housing portion 300 and a movable housing portion 310. In certain embodiments, either or both of the fixed housing portion 300 and the moving housing portion 310 are formed of 30% GF nylon. A wire yoke 350 forming two spring arm portions 351 includes an upper portion which is received in the movable housing portion 310 such that pivoting movement of the movable housing portion adjusts the positioning of the spring arm portions. In certain embodiments, the yoke is made of steel wire.

A threaded opening or receptacle 305 within the fixed housing portion 300 is configured to receive a captured threaded rod 335 including a head portion 335*a* defining, e.g., a thumbscrew, and a threaded rod portion 335*b*. In certain embodiments, the head portion 335*a* is configured to serve as a dial mechanism for advancing or retracting the threaded rod portion 335*b* with respect to the threaded opening 305, depending on the direction of rotation of the dial mechanism 335*a*. The head 335*a* of the thumbscrew is received in the movable housing portion 310. In certain embodiments, the head portion 335*a* extends through an aperture in the moving housing portion 310, such that at least a portion of the head portion 335*a* is externally accessible by the user as an adjustment mechanism. Rotating the thumbscrew 335 in one direction loosens the threaded rod 335 from the threaded opening 305 and causes the thumbscrew 335 to move outwardly from the fixed housing portion 300, engaging the movable housing portion 310 to move or pivot outwardly as well, i.e., toward the extended position. This increases the helmet attachment angle, which causes the circumaural ear cup assembly to exert more pressure via the spring arms of the wire yoke 350 against the head of the user. Rotating the dial mechanism to move the thumb screw 335 further into the threaded opening 305 will bring the movable housing portion 310 inwards towards the fixed housing portion 300, i.e., toward the upright position, which causes reduced pressure of the circumaural ear cup assembly against the user's head. In certain embodiments, the fixed housing portion 300 is configured to receive the movable housing portion 310.

The upper portion of the yoke 350 includes a generally U-shaped section passing through openings 304 in the movable housing 310. The U-shaped portion within the housing section 310 has two generally downward extending portions 303 and a generally horizontal portion 302. The horizontal portion 302 pivotally engages an upper end of the lever 330. The lower end of the lever 330 bears against the base of the movable housing 310. The U-shaped section of the yoke 350 and the lever 330 cooperate to form an over-center type toggle linkage. Manual movement of the earpiece 118 of the circumaural device 122 (see FIG. 7A) attached to the spring arms 351 toward and away from the user's ear causes the toggle members to move to an over-center position to lock the position of the earpiece 118 of the circumaural device in the engaged and disengaged position, respectively, with respect to the user's ear.

Figure 12A:
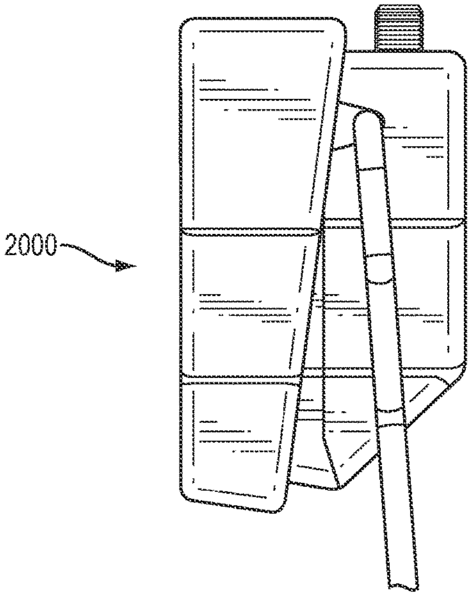
FIGS. 12A and 12C are side views of the adaptor assembly appearing in FIG. 7B in a reduced pressure position.
Figure 12C:
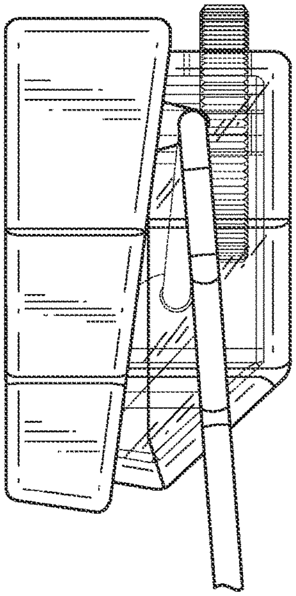
Figure 12B:
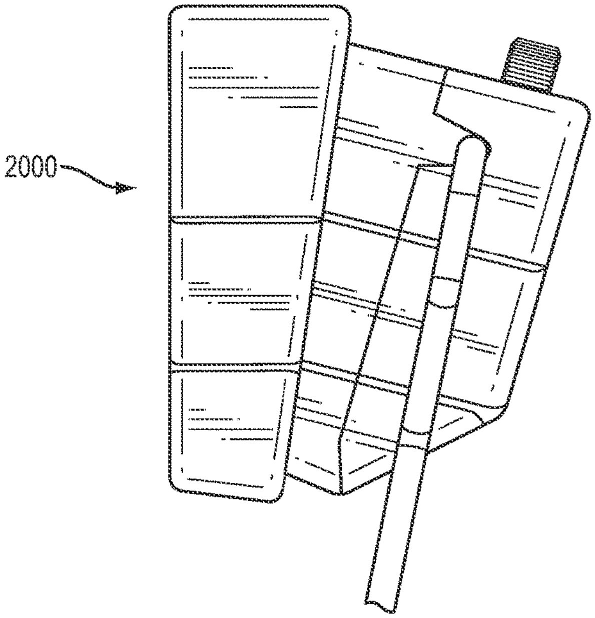
FIGS. 12B and 12D are side views of the adaptor assembly appearing in FIG. 7B in an increased pressure position.
Figure 12D:
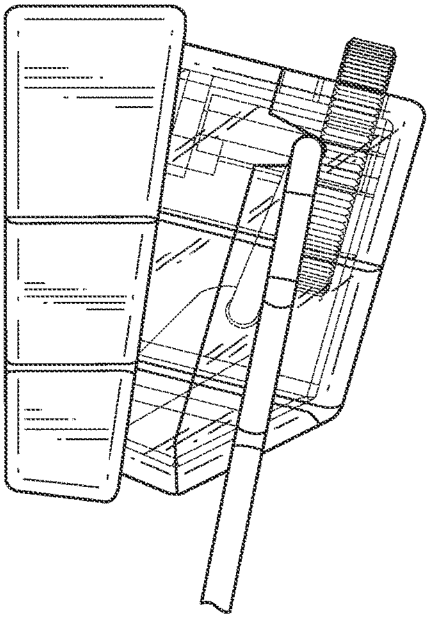
Figure 12E:
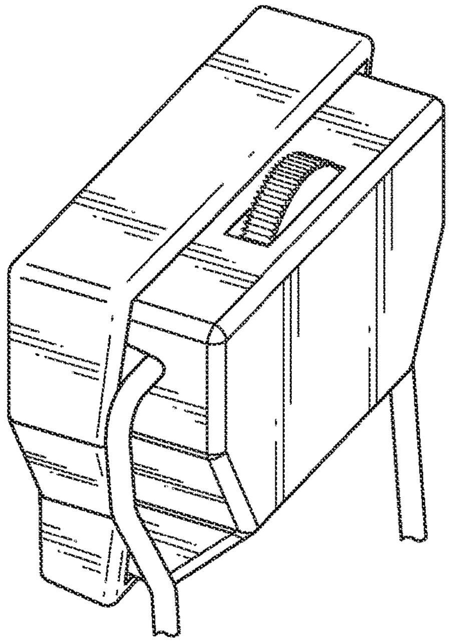
FIGS. 12E and 12G are isometric views of the adaptor assembly appearing in FIG. 7B in a reduced pressure position.
Figure 12G:
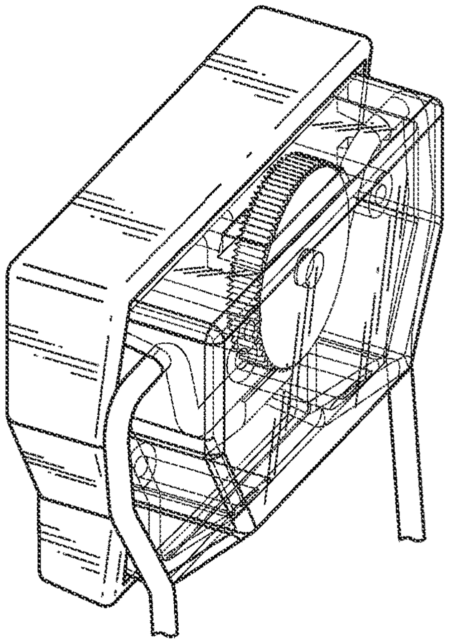
Figure 12F:
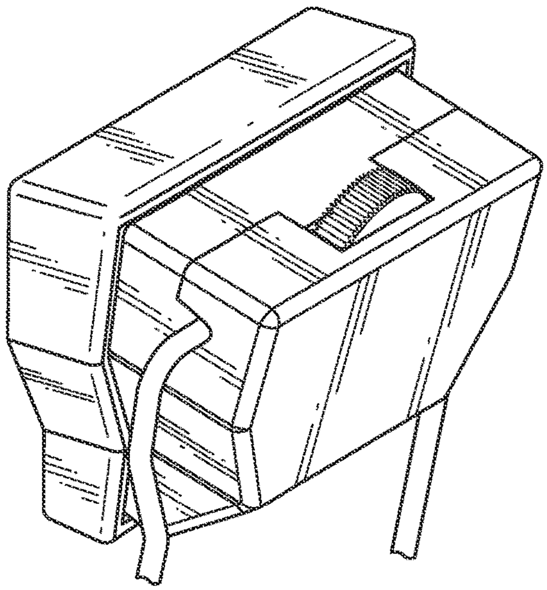
FIGS. 12F and 12H are isometric views of the adaptor assembly appearing in FIG. 7B in an increased pressure position.
Figure 12H:
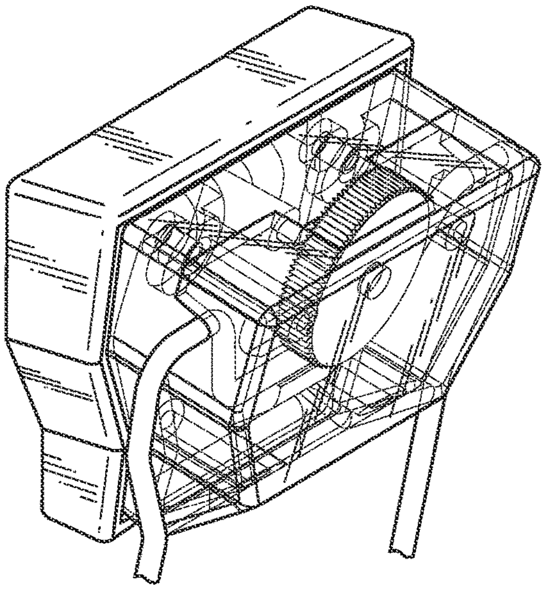

FIGS. 12A and 12B are side views of the adaptor assembly 2000 in the closed and open positions, respectively. FIGS. 12C and 12D are side views of the adaptor assembly 2000 in the closed and open positions, respectively, similar to FIGS. 12A and 12B, but wherein the movable housing portion 310 is transparent for ease of exposition. FIGS. 12E and 12F are isometric views of the adaptor assembly 2000 in the closed and open positions, respectively. FIGS. 12G and 12H are isometric views of the adaptor assembly 2000 in the closed and open positions, respectively, similar to FIGS. 12E and 12F, but wherein the movable housing portion 310 is transparent for ease of exposition.

Figure 12I:
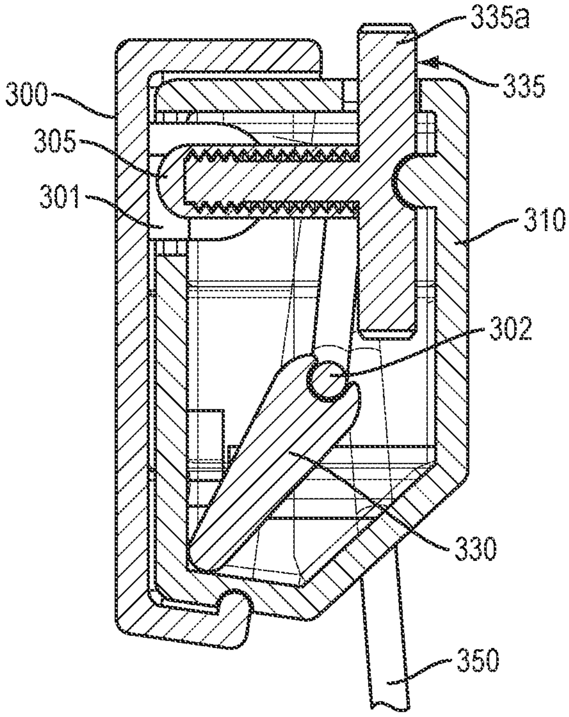
Figure 12J:
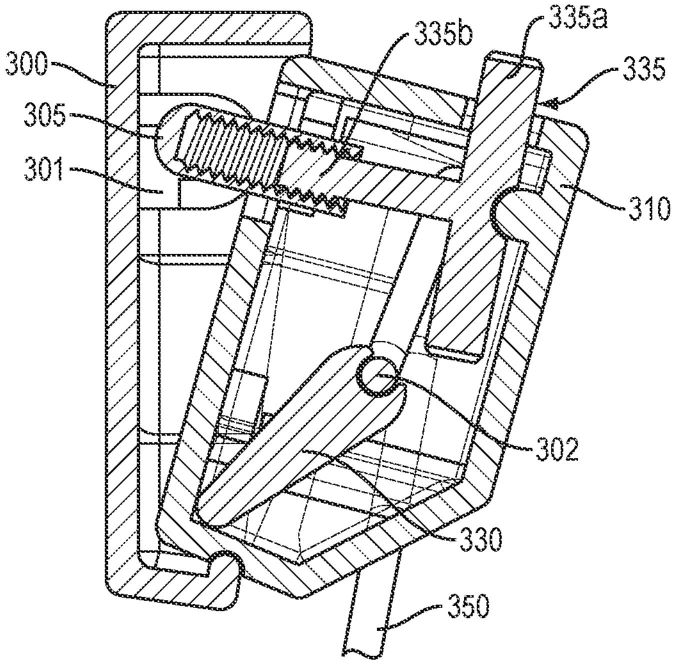
Figure 12M:
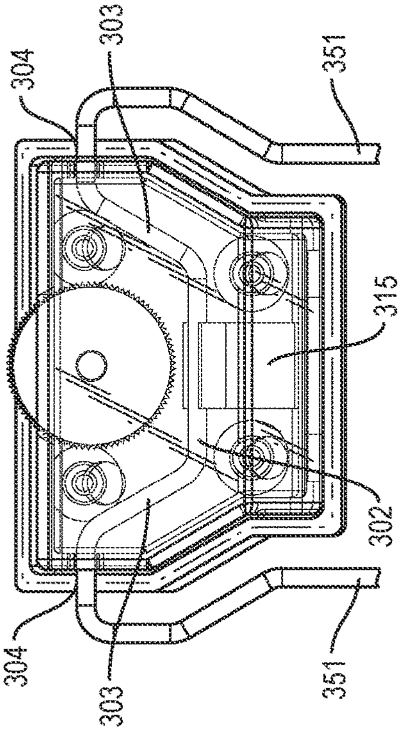
FIGS. 12K and 12M are front views of the adaptor assembly appearing in FIG. 7B in a reduced pressure position.
Figure 12N:
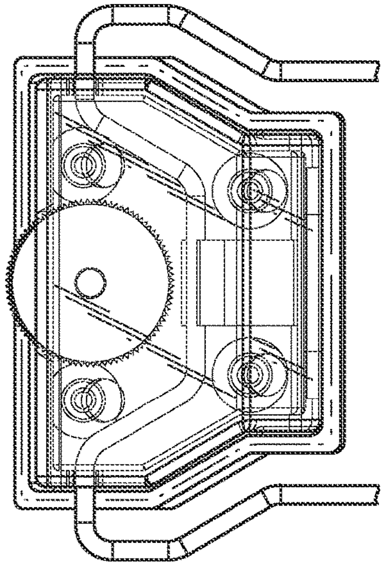
FIGS. 12L and 12N are front views of the adaptor assembly appearing in FIG. 7B in an increased pressure position.
Figure 12K:
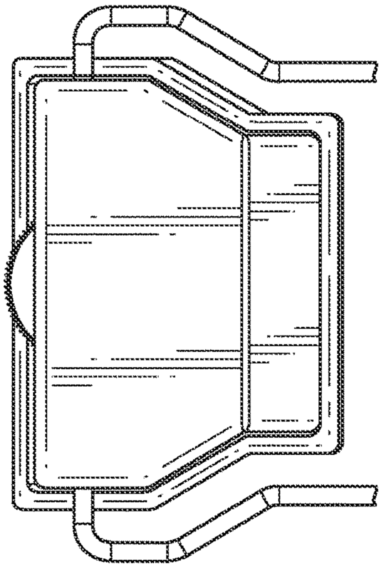
Figure 12L:
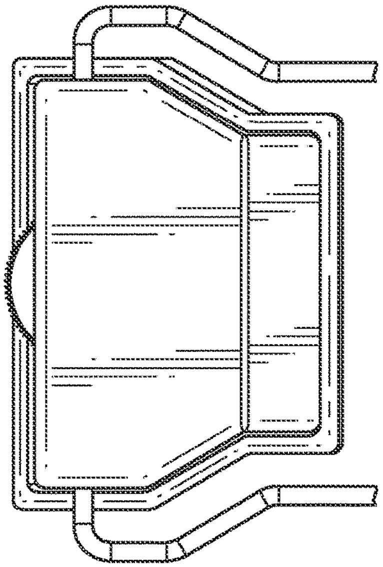

FIGS. 12I and 12J are side cross-sectional views of the adaptor assembly 2000 in the closed and open positions, respectively, illustrating the linkage between the dial mechanism and the wire yoke. FIGS. 12K and 12L are front views of the adaptor assembly 2000 in the closed and open positions, respectively. FIGS. 12M and 12N are front views of the adaptor assembly 2000 in the closed and open positions, respectively, similar to FIGS. 12K and 12L, but wherein the movable housing portion 310 is transparent for ease of exposition.

Figure 12O:
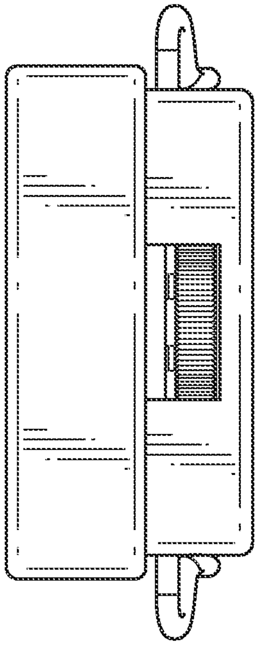
Figure 12Q:
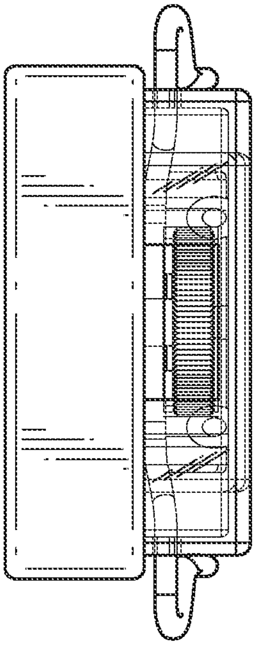
Figure 12P:
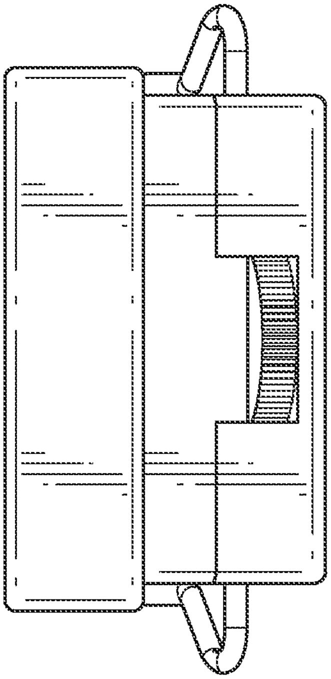
FIGS. 12P and 12R are top views of the adaptor assembly appearing in FIG. 7B in an increased pressure position.
Figure 12R:
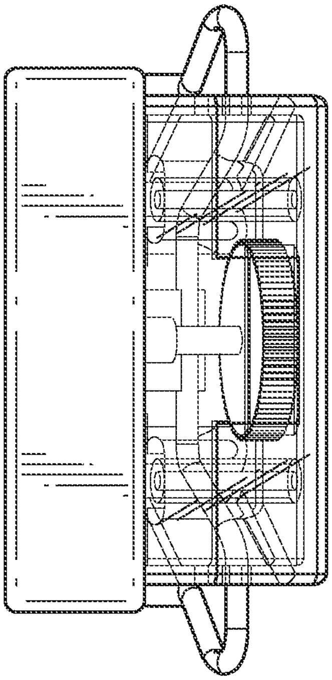

FIGS. 12O and 12P are top views of the adaptor assembly 2000 in the closed and open positions, respectively. FIGS. 12Q and 12R are top views of the adaptor assembly 2000 in the closed and open positions, respectively, similar to FIGS. 120 and 12P, but wherein the movable housing portion 310 is transparent for ease of exposition.

In a third embodiment, shown in FIGS. 10A, 10B, 11A-11E, and 13A-13R, the adaptor assembly 3000 includes a slider-adjustment mechanism for pressure relief and fit adjustment. The adaptor assembly 3000 includes a fixed housing portion 400 and a movable housing portion 410. In certain embodiments, the fixed housing portion 400 is configured to receive the movable housing portion 410. A sliding actuator member 440 is received through a transverse aperture 445 across the fixed housing portion 400 and the sliding actuator 440 further engages with a grooved portion 415 extending diagonally across the movable housing portion 410. Movement of the sliding actuator 440 along the grooved portion 415 engages the movable housing portion 410 to move or tilt inwardly toward or outwardly away from the fixed housing portion 400, relative to the position of the sliding actuator 440.

In certain embodiments, the more the movable housing portion 410 is tilted outwardly away from the fixed housing portion 400, i.e., toward the extended position, the greater the helmet attachment angle, which in turn causes the circumaural ear cup assembly to exert more pressure via the spring arms of the wire yoke 450 against the head. Conversely, sliding the sliding actuator 440 in the opposite direction to bring the movable housing portion 410 inwards towards the fixed housing portion 400, i.e., toward the upright position, causes a reduced pressure of the circumaural ear cup assembly against the user's head.

The upper portion of the yoke 450 includes a generally U-shaped section passing through openings 404 in the movable housing 410. The U-shaped portion within the housing section 410 has two generally downward extending portions 403 and a generally horizontal portion 402. The horizontal portion 402 pivotally engages a lower end of the lever 430. The upper end of the lever 430 bears against the upper wall of the movable housing 410. The U-shaped section of the yoke 450 and the lever 430 cooperate to form an over-center type toggle linkage. Manual movement of the earpiece 118 of the circumaural device attached to the spring arms 451 toward and away from the user's ear causes the toggle members to move to an over-center position to lock the position of the earpiece 118 of the circumaural device in the engaged and disengaged position, respectively, with respect to the user's ear.

Figure 13A:
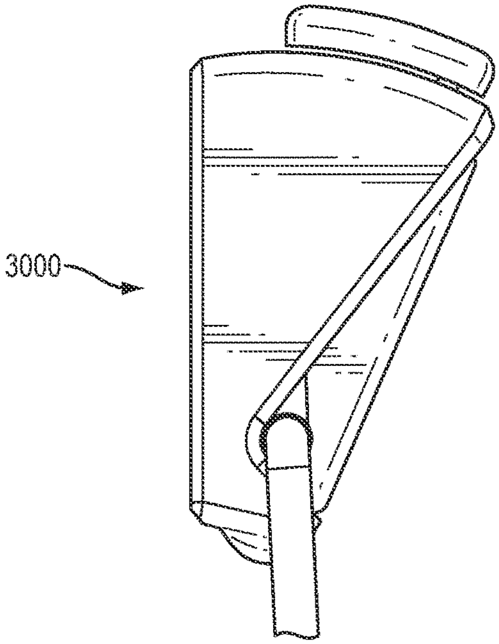
FIGS. 13A and 13C are side views of the adaptor assembly appearing in FIG. 10A in a reduced pressure position.
Figure 13C:
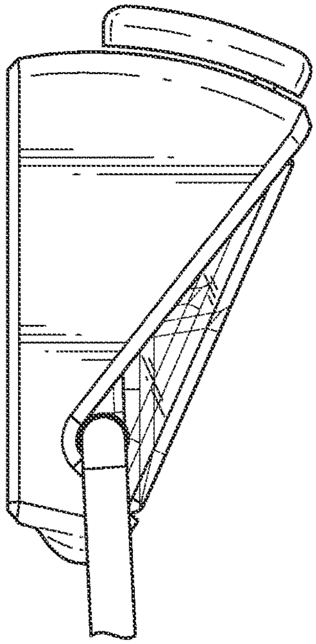
Figure 13B:
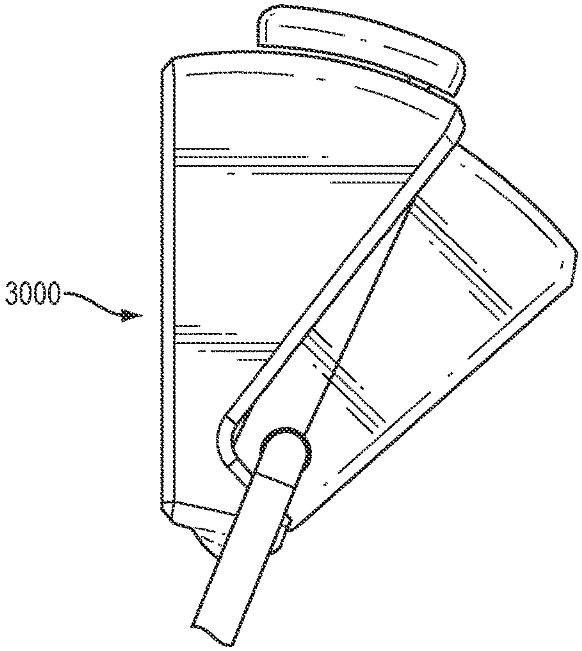
FIGS. 13B and 13D are side views of the adaptor assembly appearing in FIG. 10A in an increased pressure position.
Figure 13D:
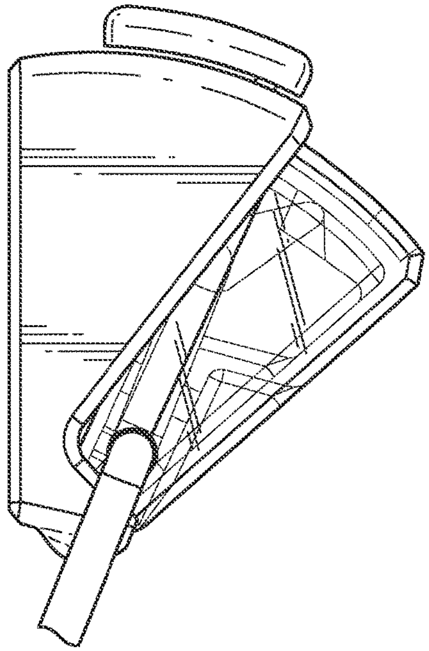
Figure 13E:
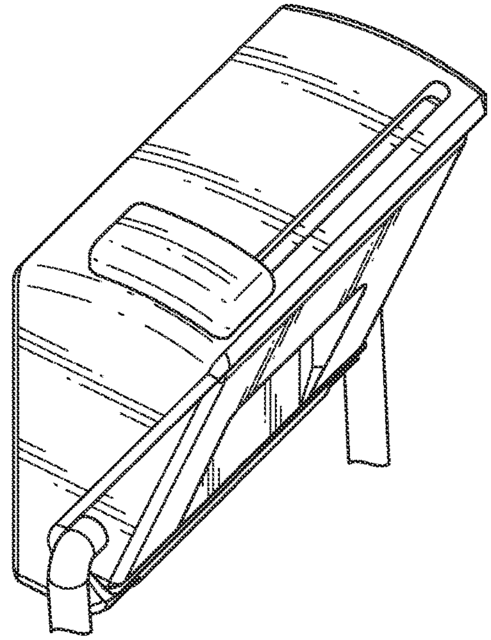
FIGS. 13E and 13G are isometric views of the adaptor assembly appearing in FIG. 10A in a reduced pressure position.
Figure 13G:
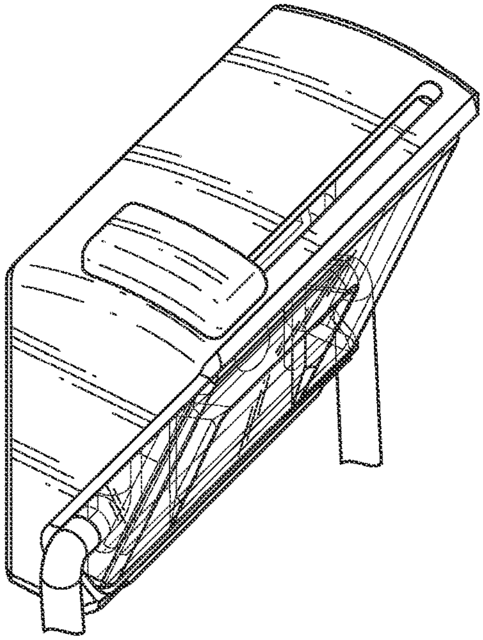
Figure 13F:
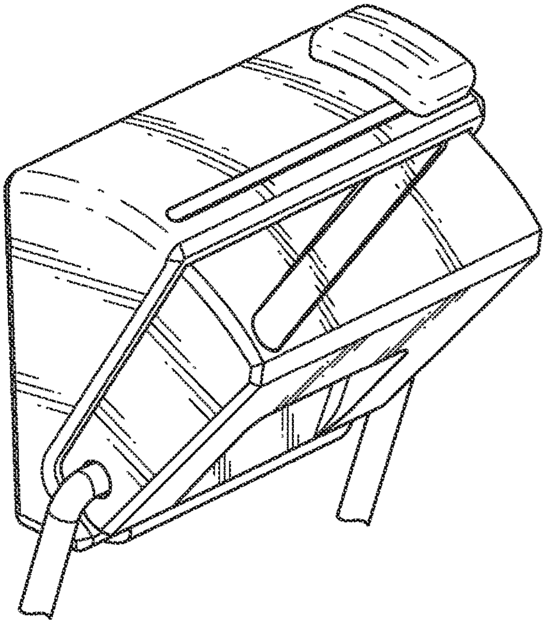
FIGS. 13F and 13H are isometric views of the adaptor assembly appearing in FIG. 10A in an increased pressure position.
Figure 13H:
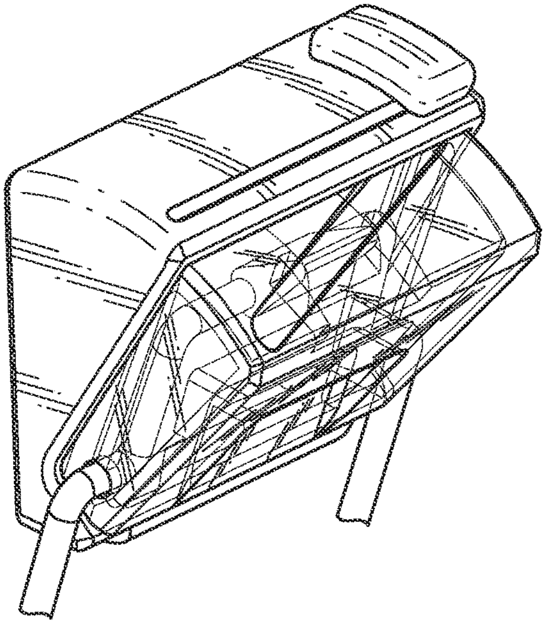

FIGS. 13A and 13B are side views of the adaptor assembly 3000 in the closed and open positions, respectively. FIGS. 13C and 13D are side views of the adaptor assembly 3000 in the closed and open positions, respectively, similar to FIGS. 13A and 13B, but wherein the movable housing portion 410 is transparent for ease of exposition. FIGS. 13E and 13F are isometric views of the adaptor assembly 3000 in the closed and open positions, respectively. FIGS. 13G and 13H are isometric views of the adaptor assembly 3000 in the closed and open positions, respectively, similar to FIGS. 13E and 13F, but wherein the movable housing portion 410 is transparent for ease of exposition.

Figure 13I:
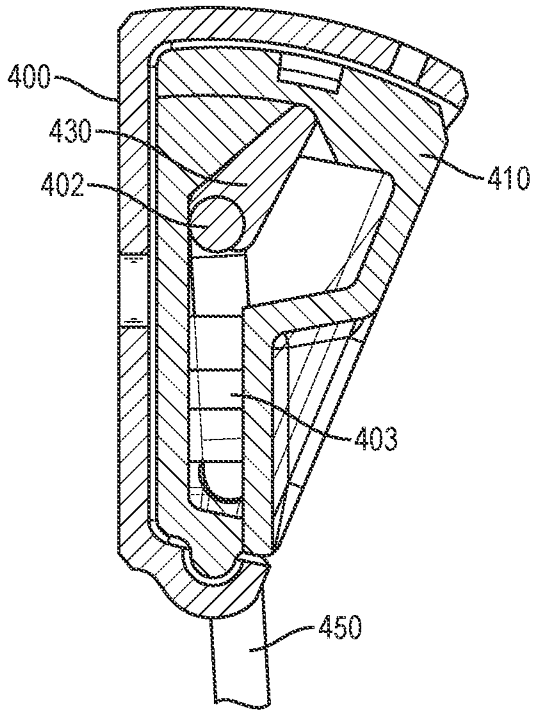
Figure 13J:
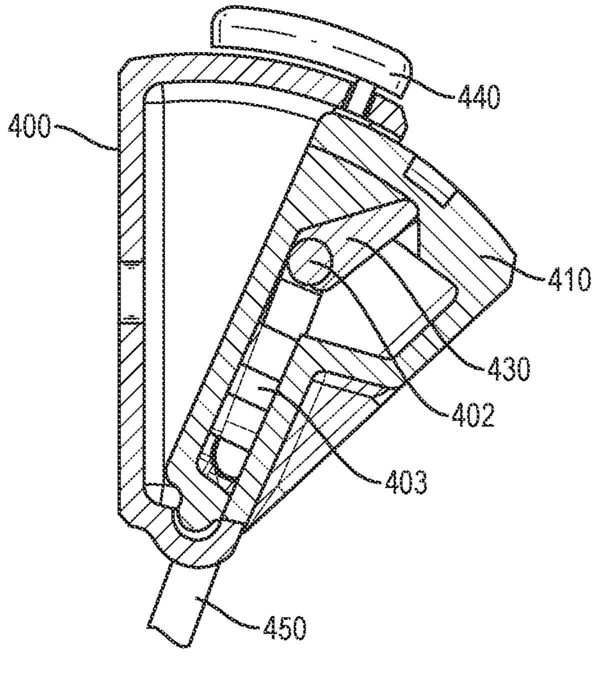
Figure 13M:
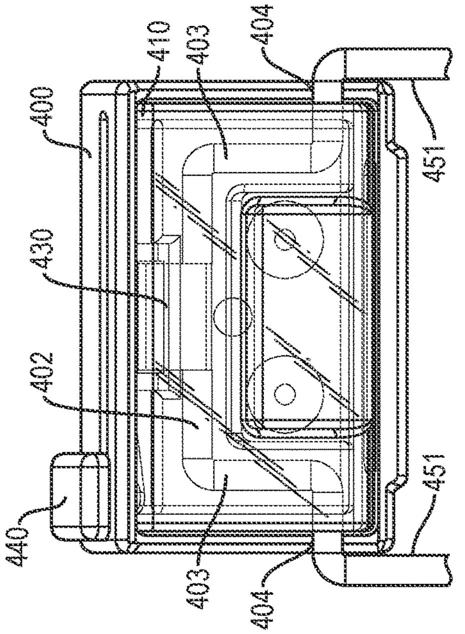
FIGS. 13K and 13M are front views of the adaptor assembly appearing in FIG. 10A in a reduced pressure position.
Figure 13N:
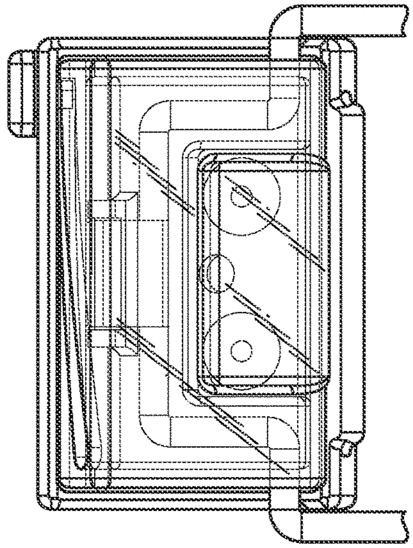
FIGS. 13L and 13N are front views of the adaptor assembly appearing in FIG. 10A in an increased pressure position.
Figure 13K:
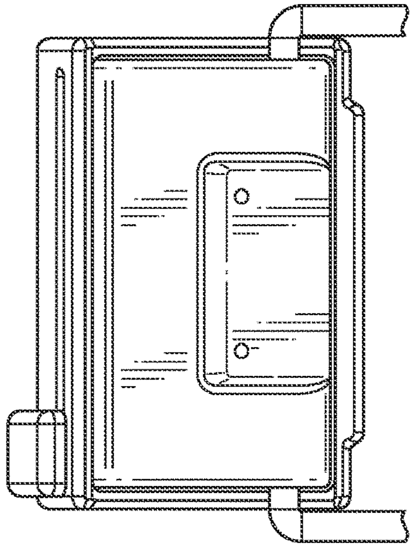
Figure 13L:
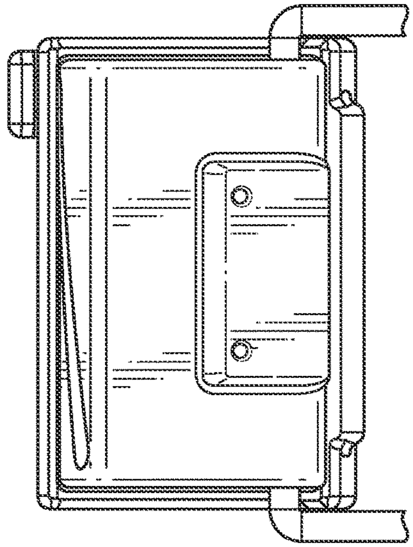

FIGS. 13I and 13J are side cross-sectional views of the adaptor assembly 3000 in the closed and open positions, respectively, illustrating the linkage between the slider mechanism and the wire yoke. FIGS. 13K and 13L are front views of the adaptor assembly 3000 in the closed and open positions, respectively. FIGS. 13M and 13N are front views of the adaptor assembly 3000 in the closed and open positions, respectively, similar to FIGS. 13K and 13L, but wherein the movable housing portion 410 is transparent for ease of exposition.

Figure 13O:
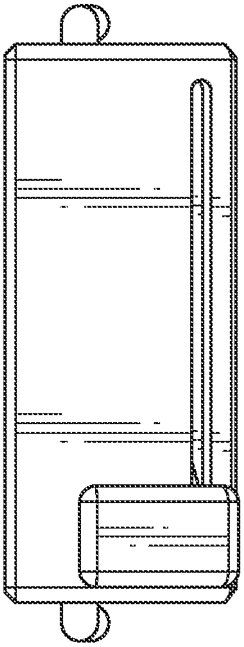
Figure 13Q:
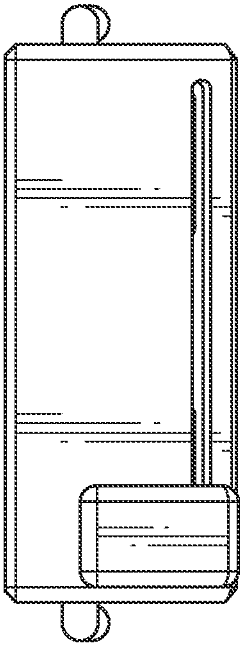
Figure 13P:
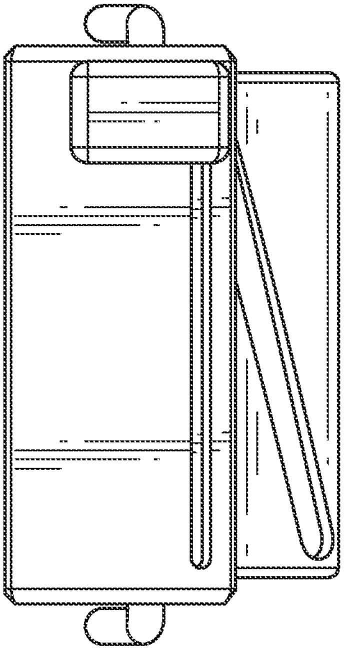
FIGS. 13P and 13R are top views of the adaptor assembly appearing in FIG. 10A in an increased pressure position.
Figure 13R:
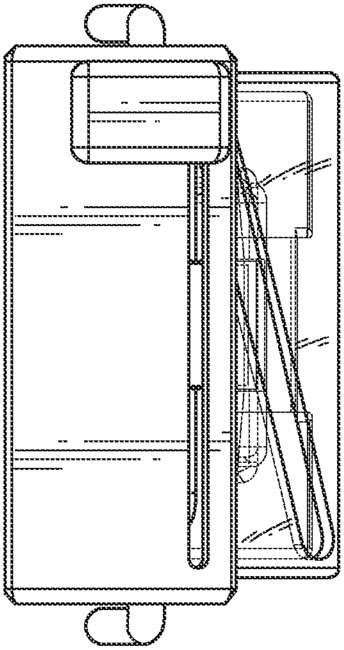

FIGS. 13O and 13P are top views of the adaptor assembly 3000 in the closed and open positions, respectively. FIGS. 13Q and 13R are top views of the adaptor assembly 3000 in the closed and open positions, respectively, similar to FIGS. 13O and 13P, but wherein the movable housing portion 410 is transparent for ease of exposition.

The invention has been described with reference to the preferred embodiment. Modifications and alterations will occur to others upon a reading and understanding of the preceding detailed description. It is intended that the invention be construed as including all such modifications and alterations insofar as they come within the scope of the amended claims and equivalents thereof.

What is claimed is:

1. An adapter assembly for attaching a circumaural device to a mounting interface on a helmet, the adapter assembly comprising:

a fastener element configured to releasably couple to the mounting interface;

a pressure relief assembly coupled to the fastener element, the pressure relief assembly having a pivoting subassembly and an adjustment subassembly, the pivoting subassembly pivotable about a pivot axis and having a range of travel between an upright position and an extended position;

one or more attachment arms having a proximal end coupled to the pressure relief assembly and a distal end for attaching the circumaural device; and said adjustment subassembly having a manually operable control portion to cause pivoting movement of the pivoting subassembly, wherein pivoting movement of the pivoting subassembly toward the upright position decreases a pressure of an attached circumaural device on a wearer's head when the wearer dons the adapter assembly, and wherein pivoting movement of the pivoting subassembly toward the extended position increases a pressure of an attached circumaural device on the wearer's head when the wearer dons the adapter assembly.

2. The adapter assembly of claim 1, wherein the one or more attachment arms provides a spring bias of the circumaural device toward the wearer's head when the wearer dons the adapter assembly.

3. The adapter assembly of claim 1, wherein the circumaural device comprises an ear cup.

4. The adapter assembly of claim 3, wherein the ear cup comprises an annular cushion.

5. The adapter assembly of claim 1, wherein the one or more attachment arms comprises a yoke having a center portion extending generally parallel to the pivot axis and two arms extending from opposite ends of the center portion.

6. The adapter assembly of claim 1, further comprising an ear cup attached to the distal end of the one or more attachment arms.

7. The adapter assembly of claim 6, wherein the ear cup is releasably attached to the distal end of the one or more attachment arms.

8. The adapter assembly of claim 6, wherein the ear cup is selected from the group consisting of an audio speaker device and hearing protection device.

9. The adapter assembly of claim 1, wherein the range of travel between the upright position and the extended position is 30 degrees.

10. The adapter assembly of claim 1, wherein a position of the adjustment subassembly is continuously adjustable between the upright position and the extended position.

11. The adapter assembly of claim 1, wherein the adjustment subassembly comprises:

a manually rotatable worm screw rotatable to selectively advance or retract an actuator; and at least a portion of the actuator riding in a slot in a housing of the pivoting subassembly to cause pivoting movement of the pivoting subassembly toward the upright position when the worm screw is rotated in a first direction and to cause pivoting movement of the pivoting subassembly toward the extended position when the worm screw is rotated in a second direction opposite the first direction.

12. The adapter assembly of claim 1, further comprising:

said adjustment subassembly including a housing having a movable housing portion and a fixed housing portion;

a threaded receptacle disposed within the fixed housing portion, the threaded receptacle receiving a threaded rod having an enlarged diameter portion, the enlarged diameter portion disposed within the movable housing portion, the enlarged diameter portion being manually rotatable to selectively advance the threaded rod portion with respect to the threaded receptacle when the enlarged diameter portion is rotated in a first direction and retract the threaded rod portion with respect to the threaded receptacle when the enlarged diameter portion is rotated in a second direction opposite the first direction;

wherein rotating the enlarged diameter portion in the first direction causes the pivoting subassembly to pivot about the pivot axis toward the upright position; and wherein rotating the enlarged diameter portion in the second direction causes the movable housing portion to pivot toward the extended position.

13. The adapter assembly of claim 12, wherein the enlarged diameter portion extends through an aperture in the movable housing portion.

14. The adapter assembly of claim 12, further comprising:

a lever disposed within the movable housing and pivotally coupled to the one or more arms; and the one or more arms and the lever cooperating to define an over-center toggle linkage to allow pivoting movement of the one or more arms with respect to the movable housing between a disengaged position and an engaged position.

15. The adapter assembly of claim 14, wherein the one or more attachment arms comprises a yoke having a center portion extending generally parallel to the pivot axis and two arms extending from opposite ends of the center portion.

16. The adapter assembly of claim 15, wherein the center portion is pivotally attached to an end of the lever.

17. The adapter assembly of claim 1, further comprising:

said adjustment subassembly including a housing having a movable housing portion and a fixed housing portion;

a sliding actuator member received through an elongate transverse aperture in the fixed housing portion, the elongate transverse aperture extending generally parallel to the pivot axis;

the sliding actuator engaging with a groove in the movable housing portion, the groove extending at an angle with respect to the pivot axis;

wherein sliding the sliding actuator in a first direction causes the movable housing portion to pivot toward the upright position; and wherein sliding the sliding actuator in a second direction opposite the first direction causes the movable housing portion to pivot toward the extended position.

18. The adapter assembly of claim 17, further comprising:

a lever disposed within the movable housing and pivotally coupled to the one or more arms; and the one or more arms and the lever cooperating to define an over-center toggle linkage to allow pivoting movement of the one or more arms with respect to the movable housing between a disengaged position and an engaged position.

19. The adapter assembly of claim 18, wherein the one or more attachment arms comprises a yoke having a center portion extending generally parallel to the pivot axis and two arms extending from opposite ends of the center portion.

20. The adapter assembly of claim 19, wherein the center portion is pivotally attached to an end of the lever.

* * * * *